United States Patent
Miyauchi

(10) Patent No.: US 7,193,821 B2
(45) Date of Patent: Mar. 20, 2007

(54) THIN FILM MAGNETIC HEAD AND METHOD FOR MANUFACTURING THE SAME

(75) Inventor: Daisuke Miyauchi, Tokyo (JP)

(73) Assignee: TDK Corporation, Tokyo (JP)

(*) Notice: Subject to any disclaimer, the term of this patent is extended or adjusted under 35 U.S.C. 154(b) by 442 days.

(21) Appl. No.: 10/809,529

(22) Filed: Mar. 26, 2004

(65) Prior Publication Data
US 2004/0190205 A1 Sep. 30, 2004

(30) Foreign Application Priority Data
Mar. 28, 2003 (JP) .............................. 2003-092842
Dec. 8, 2003 (JP) .............................. 2003-409417

(51) Int. Cl.
*G11B 5/39* (2006.01)
(52) U.S. Cl. ................................... 360/324.1
(58) Field of Classification Search ............. 360/324.1, 360/324.2, 324.11, 324.12
See application file for complete search history.

(56) References Cited

U.S. PATENT DOCUMENTS

| | | | | |
|---|---|---|---|---|
| 6,636,396 B1 * | 10/2003 | Gill | ........................ | 360/324.12 |
| 6,865,062 B2 * | 3/2005 | Pinarbasi | ................ | 360/324.11 |
| 6,980,403 B2 * | 12/2005 | Hasegawa | .................. | 360/319 |
| 7,016,168 B2 * | 3/2006 | Li et al. | ................. | 360/324.12 |
| 2002/0163766 A1 | 11/2002 | Eguchi et al. | | |
| 2003/0137782 A1 * | 7/2003 | Ho et al. | ................. | 360/324.2 |

FOREIGN PATENT DOCUMENTS

| JP | A-2002-305336 | 10/2002 |
|---|---|---|
| JP | A 2002-329905 | 11/2002 |

OTHER PUBLICATIONS

Nagasaka et al., "Giant Magnetroresistance Properties of Specular Spin Valve Films in a Current Perpendicular to Plane Structure," Journal of Applied Physics, vol. 89, No. 11, pp. 6943-6945, Jun. 1, 2001.

* cited by examiner

*Primary Examiner*—William J Klimowicz
(74) *Attorney, Agent, or Firm*—Oliff and Berridge, PLC

(57) ABSTRACT

The present invention provides a thin film magnetic head and a method of manufacturing the same in which a magnetic sensitive layer can be formed as a single magnetic domain while adapting the head to higher recording density and, further, which can display a higher resistance change rate. While narrowing the magnetic sensitive layer, a vertical bias magnetic field having both sufficient intensity and uniformity can be applied to the magnetic sensitive layer. As a result, it can be promoted to form the magnetic sensitive layer as a single magnetic domain while adapting the head to higher recording density, so that reading operation can be performed more stably. Particularly, in the case of passing sense current in the thickness direction to an MR film, a higher magnetoresistive change rate can be obtained.

14 Claims, 15 Drawing Sheets

THIN FILM MAGNETIC HEAD AND METHOD FOR MANUFACTURING THE SAME

BACKGROUND OF THE INVENTION

1. Field of the Invention

The present invention relates to a thin film magnetic head using a giant magnetoresistive effect and, more particularly, to a thin film magnetic head constructed so that current is passed in a stacking direction in a magnetoresistive effect film and a method of manufacturing the same.

2. Description of the Related Art

Hitherto, for reproducing information on a magnetic recording medium such as a hard disk, a thin film magnetic head having an MR element displaying a magnetoresistive (MR) effect is widely used. In resent years, recording density of a magnetic recording medium is increasing, and a thin film magnetic head using a giant magnetoresistive effect element (GMR element) displaying a giant magnetoresistive (GMR) effect is generally used. An example of the GMR elements is a spin valve (SV) type GMR element.

The SV-type GMR element includes an SV film having a structure in which a magnetic layer whose magnetization direction is pinned and a magnetic layer whose magnetization direction changes according to a signal magnetic field from the outside are stacked via a nonmagnetic layer, and is constructed so that sense current flows in a multilayer in-plane direction at the time of reproducing operation. Such a GMR element is particularly called a CIP (Current in Plane)-GMR element. In this case, electric resistance of the sense current changes according to relative angles of the magnetization directions in the two magnetic layers of the SV film.

Recently, to adapt to further improvement in recording density, a thin film magnetic head having a tunnel magnetoresistance (TMR) effect element using tunnel current flowing in a very thin insulating layer is being developed. The TMR element includes a TMR film of a structure in which a very thin insulating layer is provided between two magnetic layers and is constructed so that sense current flows in the stacking direction in reproducing operation. In this case, electric resistance at the time of passage of the tunnel current through the very thin insulating layer changes according to a signal magnetic field from the outside.

On the other hand, like the TMR element, a thin film magnetic head having a CPP (Current Perpendicular to the Plane)-GMR element constructed so that sense current flows in the stacking direction is also being developed (refer to, for example, "Journal of Applied Physics", Vol. 89, No. 11, p. 6943, 2001 (non-patent document 1)). FIG. 20 shows an example of a sectional configuration of such a conventional CPP-GMR element (MR element 110). FIG. 20 is a cross section seen from a recording medium facing surface which faces a magnetic recording medium from which information is read. As shown in FIG. 20, the MR element 110 has an SV film 120 which is a metal multilayer film, a pair of magnetic domain control films 112 disposed so as to face each other while sandwiching the SV film 120 in a direction (X direction) corresponding to the recording track width direction, and a lower shield layer 111 and an upper shield layer 114 formed so as to sandwich the SV film 120 and the pair of magnetic domain control films 112 in the stacking direction (Z direction). A pair of insulating layers 115 are formed between the SV film 120 and the pair of magnetic domain control films 112. Further, a pair of insulating layers 113 are formed between the upper shield layer 114 and the pair of magnetic domain control films 112. The SV film 120 has, in order from the side of the lower shield layer 111, an under layer 131, an antiferromagnetic layer 132, a magnetization direction pinned layer 133, a magnetic sensitive layer 134, and a protection layer 135. The magnetization direction pinned layer 133 has a three-layer structure in which a nonmagnetic layer 133B is formed between two ferromagnetic layers 133A and 133C and its magnetization direction is pinned by the antiferromagnetic layer 132. The magnetic sensitive layer 134 has a three-layer structure in which a ferromagnetic layer 134B is formed between two nonmagnetic layers 134A and 134C. The pair of magnetic domain control films 112 act on the ferromagnetic layer 134B so that the ferromagnetic layer 134B is formed as a single magnetic domain.

The CPP-GMR element as shown in FIG. 20 has advantages such that resistance is lower as compared with that of the TMR element and a higher output can be obtained as compared with an output of a CIP-GMR element even in the case where a track width is very narrow. Concretely, in the TMR element, a tunnel barrier layer has to have a certain degree of thickness from the viewpoint of manufacturing or the like, and a sufficiently small resistance value R is not obtained. On the other hand, in the CIP-GMR element, sense current is passed in the in-plane direction. Therefore, as the width in the direction corresponding to the recording track width direction decreases, a magnetic sensitive part through which the sense current passes is very narrowed, and a resistance change amount $\Delta R$ decreases. In the CPP-GMR element, however, the sense current is passed in the stacking direction, so that an influence on the resistance charge amount $\Delta R$ exerted by reduction in the recording track width direction is small. Different from the TMR element, an insulating material is not included as an element of the SV film, so that the resistance value R is small. From such background, expectation for the CPP-GMR element is increasing as an element capable of adapting to further improvement in recording density. For example, in the CPP-GMR element described in Japanese Unexamined Patent Publication No. 2002-329905 (patent document 1), the width of a portion including a magnetic sensitive layer in the GMR film is further reduced, and a narrower effective core width is realized.

In the CPP-GMR element described in the patent document 1, however, an insulator is provided between a portion (upper layer member) including the magnetic sensitive layer in the SV film and a magnetic domain control film. Due to this, contribution of a vertical bias magnetic field to the magnetic sensitive layer is insufficient, and it is concerned that a single magnetic domain is not sufficiently formed. Specifically, in the configuration of the patent document 1, the distance between the magnetic sensitive layer and the magnetic domain control film is long, so that a magnetic flux generated by the magnetic domain control film passes mainly upper and lower shield layers, not the magnetic sensitive layer. It is considered that a sufficient vertical bias magnetic field is not applied to the magnetic sensitive layer.

Further, in the CPP-GMR element, the resistance value of a portion which does not contribute so much to the resistance change amount $\Delta R$ is larger than the resistance value of a portion largely contributing to the resistance change amount $\Delta R$. Therefore, only a relatively low magnetic resistance change rate (also called MR ratio) $\Delta R/R$ is obtained, so that improvements are being demanded. Since the upper and lower shield layers (a lower shield layer 111 and an upper shield layer 114 in FIG. 20) also have a function of lead layers for passing current to the SV film, the CPP-GMR element is inherently advantageous to achieve higher recording density more than the CIP-GMR element separately requiring a lead layer. For example, in the conventional CPP-GMR element as shown in FIG. 20, however, both ends of a top surface 120U (a boundary surface with the upper shield layer 114) of the SV film 120 are partially covered with the insulating layer 113, and the top surface 113U (a boundary surface with the upper shield layer 114) is swollen to the side of the upper shield layer 114, so that a gap G is formed in the Z direction. Consequently, a shield effect of the upper shield layer 114 is weakened, and it is considered to be a factor of disturbing increase in packing density.

SUMMARY OF THE INVENTION

The present invention has been achieved in consideration of the problems and its first object is to provide a thin film magnetic head and a method of manufacturing the same, capable of excellently making a magnetic sensitive layer a single magnetic domain while adapting to higher recording density. A second object is to provide a thin film magnetic head and a method of manufacturing the same, capable of expressing a high resistance charge rate.

A thin film magnetic head of the invention comprises: a magnetoresistive effect film having a first stacked part including a magnetic sensitive layer of which magnetization direction changes according to a signal magnetic field from a magnetic recording medium and extending so that width in a first direction corresponding to a recording track width direction of the magnetic recording medium is first width, and a second stacked part having a first antiferromagnetic layer and extending so that the width in the first direction is second width which is larger than the first width; and a pair of magnetic domain control films having a pair of first magnetic domain control parts which are disposed so as to face each other at an interval corresponding to the first width while sandwiching the first stacked part in the first direction and applying a vertical bias magnetic field to the magnetic sensitive layer, and a pair of second magnetic domain control parts which are disposed so as to face each other while sandwiching the second stacked part in the first direction and applying a vertical bias magnetic field to the magnetic sensitive layer. Preferably, the pair of second magnetic domain control parts are disposed so as to face each other at an interval corresponding to the second width.

In the thin film magnetic head of the invention, the pair of first magnetic domain control parts are disposed so as to face each other while sandwiching the first stacked part including the magnetic sensitive layer and having the first width at an interval corresponding to the first width, so that the first magnetic domain control parts are provided so as to be adjacent to the magnetic sensitive layer. In addition, the pair of second magnetic domain control parts are disposed so as to face each other while sandwiching the second stacked part having the second width which is larger than the first width, so that a proper distance between the pair of second magnetic domain control parts and the magnetic sensitive layer in the first stacked part is assured. If it is constructed to pass current in the thickness direction (second direction) to the magnetoresistive effect film, in the magnetoresistive effect film, resistivity is high and the second width in the second stacked part which does not contribute so much to a resistance change amount is assured to be wider than the first width, so that the following action is obtained. The resistance value of the second stacked part decreases only by the wider amount of the second width than the first width in the second stacked part and, accordingly, the resistance value of the whole magnetoresistive effect film decreases. On the other hand, even in the case where the second width is larger than the first width, the resistance change amount of the whole magnetoresistive effect film hardly differs from that in the case where the second width is equal to the first width. Therefore, while adapting the first width in the first stacked part including the magnetic sensitive layer to the narrower recording track width, a high magnetoresistive change rate (resistance change amount/resistance value) is obtained.

In the thin film magnetic head according to the invention, the second stacked part further has a first magnetization direction pinned layer of which magnetization direction is pinned by the first antiferromagnetic layer, and the first stacked part further may include a second antiferromagnetic layer, and a second magnetization direction pinned layer whose magnetization direction is pinned by the second antiferromagnetic layer. Preferably, the second width is equal to or larger than width which is three times as large as the first width, and is equal to or less than width which is ten times as large as the first width. Concretely, it is desired that the first width lies in a range from 0.05 μm to 0.1 μm, and the second width is in a range from 0.3 μm to 0.5 μm. In such a manner, while adapting to reproduction of a magnetic recording medium having high recording density, a vertical bias magnetic field to be applied to the magnetic sensitive layer has a flatter intensity distribution. In a second direction corresponding to a thickness direction of the magnetoresistive effect film, preferably, center of thickness of the magnetic sensitive layer is in a position corresponding to center of the pair of first magnetic domain control parts. Further, in the case of providing the first and second shield layers which are disposed so as to face each other while sandwiching the magnetoresistive effect film and the pair of magnetic domain control films in the second direction and serve as a current path for passing current in the second direction to the magnetoresistive effect film, it is preferable that the first shield layer be in contact with the second stacked part and the pair of magnetic domain control films, and the second shield layer be in contact with the first stacked part and be isolated from the pair of magnetic domain control films by the insulating film.

Further, in the thin film magnetic head of the invention, a first boundary surface between the second shield layer and the first stacked part is flat in the first direction, and a second boundary surface between the second shield layer and the insulating film extends in the first direction in a plane extended from the first boundary surface or on the side closer to the first shield layer than the extended plane. With the configuration, the pit length is specified by the width corresponding to the thickness of the magnetoresistive effect film, and smaller PW50 is obtained.

In the thin film magnetic head of the invention, a pair of intermediate insulating films may be formed between the pair of first magnetic domain control parts and the first stacked part. In this case, it is preferable that the intermediate insulating film have a thickness which is in a range from 5 nm to 10 nm.

In the thin film magnetic head of the invention, preferably, a ratio between thickness in a stacking direction of the first magnetic domain control part and thickness in a stacking direction of the second magnetic domain control part satisfies the following conditional expression (1). T1 denotes thickness in the stacking direction of the first magnetic domain control part, and T2 indicates thickness in the stacking direction of the second magnetic domain control part. In this case, for example, total of the thickness in the stacking direction of the first magnetic domain control part and the thickness in the stacking direction of the second magnetic domain control part is 50 nm or less.

$$\frac{1}{4} \leq T1/T2 \leq \frac{2}{3} \quad (1)$$

In the thin film magnetic head of the invention, the pair of first magnetic domain control parts and the pair of second magnetic domain control parts can have coercive forces which are different from each other. For example, either the pair of first magnetic domain control parts or the pair of second magnetic domain control parts is made of a material containing cobalt platinum alloy (CoPt) and the other pair is made of a material containing cobalt chromium platinum alloy (CoCrPt). In this case, the pair of magnetic domain control parts and the pair of second magnetic domain control parts can have magnetization directions which are different from each other. For example, the pair of first magnetic domain control parts may have a magnetization direction corresponding to the direction of axis of easy magnetization of the magnetic sensitive layer, and the pair of second magnetic domain control parts may have a magnetization direction which is orthogonal to the magnetization direction of the pair of first magnetic domain control parts.

A method of manufacturing a thin film magnetic head in a first aspect of the invention comprising, on a substrate: a magnetoresistive effect film of a predetermined shape; a pair of magnetic domain control films disposed so as to face each other while sandwiching the magnetoresistive effect film in a first direction corresponding to a recording track width direction of a magnetic recording medium, and each having first and second magnetic domain control parts; and first and second shield layers facing each other while sandwiching the magnetoresistive effect film and the pair of magnetic domain control films in a second direction corresponding to a thickness direction of the magnetoresistive effect film, the method comprises: a first shield forming step of forming the first shield layer on the substrate; a multilayer film forming step of forming, on the first shield layer, a multilayer film including a structure in which an antiferromagnetic layer, a magnetization direction pinned layer, and a magnetic sensitive layer are stacked in order from the side of the first shield layer; a first resist pattern forming step of selectively forming a first resist pattern on the multilayer film; a multilayer film pattern forming step of forming a multilayer film pattern by selectively etching the multilayer film by using the first resist pattern as a mask; a second magnetic domain control part forming step of forming the second magnetic domain control part by forming a ferromagnetic film on an entire surface and removing the first resist pattern; a second resist pattern forming step of selectively forming a second resist pattern so as to protect a region corresponding to a part which specifies recording track width of the multilayer film pattern; a magnetoresistive effect film forming step of etching the multilayer film pattern in a non-protection region by using the second resist pattern as a mask so as to remove at least all of the magnetic sensitive layer in the second direction and to leave at least a part of the antiferromagnetic layer in the second direction, thereby completing formation of the magnetoresistive effect film including a first stacked part of which width in the first direction is first width and a second stacked part having second width larger than the first width; a magnetic domain control film forming step of forming the first magnetic domain control part in a region etched in the magnetoresistive effect film forming step, thereby completing formation of the pair of magnetic domain control films; an insulating film forming step of forming an insulating film on the pair of magnetic domain control films; and a second shield forming step of removing the second resist pattern and, after that, forming the second shield layer on an entire surface.

A method of manufacturing a thin film magnetic head in a second aspect of the invention comprising, on a substrate: a magnetoresistive effect film of a predetermined shape; a pair of magnetic domain control films disposed so as to face each other while sandwiching the magnetoresistive effect film in a first direction corresponding to a recording track width direction of a magnetic recording medium, and each having first and second magnetic domain control parts; and first and second shield layers facing each other while sandwiching the magnetoresistive effect film and the pair of magnetic domain control films in a second direction corresponding to a thickness direction of the magnetoresistive effect film, the method includes: a first shield forming step of forming the first shield layer on the substrate; a multilayer film forming step of forming a multilayer film including a structure in which a first antiferromagnetic layer, a first magnetization direction pinned layer, a magnetic sensitive layer, a second magnetization direction pinned layer, and a second antiferromagnetic layer are stacked on the first shield layer in order from the side of the first shield layer; a first resist pattern forming step of selectively forming a first resist pattern on the multilayer film; a multilayer film pattern forming step of forming a multilayer film pattern by selectively etching the multilayer film by using the first resist pattern as a mask; a second magnetic domain control part forming step of forming the second magnetic domain control part by forming a ferromagnetic film on an entire surface and removing the first resist pattern; a second resist pattern forming step of selectively forming a second resist pattern so as to protect a region corresponding to a part which specifies recording track width of the multilayer film pattern; a magnetoresistive effect film forming step of etching the multilayer film pattern in a non-protection region by using the second resist pattern as a mask so as to remove at least all of the magnetic sensitive layer in the second direction and to leave at least a part of the first antiferromagnetic layer in the second direction, thereby completing formation of the magnetoresistive effect film including a first stacked part of which width in the first direction is first width, and a second stacked part having second width larger than the first width; a magnetic domain control film forming step of forming the first magnetic domain control part in a region etched in the magnetoresistive effect film forming step, thereby completing formation of the pair of magnetic domain control films; an insulating film forming step of forming an insulating film on the pair of magnetic domain control films; and a second shield forming step of removing the second resist pattern and, after that, forming the second shield layer on an entire surface.

In each of the methods of manufacturing the thin film magnetic head according to the first and second aspects of the invention, by including the above-described steps, in the first direction, the magnetoresistive effect film having the first stacked part including the magnetic sensitive layer and having the first width and the second stacked part having second width wider than the first width and which does not contribute so much to the resistance change amount is formed. The resistance value of the second stacked part decreases only by the wider amount of the second width than the first width in the second stacked part and, accordingly, the resistance value of the whole magnetoresistive effect film decreases. On the other hand, even in the case where the second width is set to be larger than the first width, the resistance change amount of the whole magnetoresistive effect film hardly differs from that in the case where the second width is equal to the first width. Therefore, while adapting the first width in the first stacked part to the narrower recording track width, a high magnetoresistive change rate (resistance change amount/resistance value) is obtained. In addition, the first magnetic domain control part is formed in a region obtained by etching a part in the second direction of the multilayer film pattern by using the second resist pattern as a mask. Consequently, the first magnetic domain control part is provided so as to be adjacent to the first stacked part. Further, since the second magnetic domain control part is formed in the region obtained by selectively removing the multilayer film by etching with the first resist pattern as a mask, a proper distance between the magnetic sensitive layer in the first stacked part and the second magnetic domain control part is assured.

In each of the methods of manufacturing a thin film magnetic head in the first and second aspects of the invention, at the time of forming the first magnetic domain control part in the magnetic domain control film forming step, a material having a coercive force different from that of the second magnetic domain control part is used. The method may further comprise a step of polarizing the first magnetic domain control part to a magnetization direction corresponding to a direction of an axis of easy magnetization of the magnetic sensitive layer and polarizing the second magnetic domain control part to a direction different from the magnetization direction of the first magnetic domain control part by using the coercive force difference.

In the thin film magnetic head of the invention and the method of manufacturing the same, a pair of first magnetic domain control parts sandwich the first stacked part including the magnetic sensitive layer and having first width at an interval corresponding to the first width, so that the first magnetic domain control parts can be provided so as to be adjacent to the magnetic sensitive layer. In addition, by disposing the pair of second magnetic domain control parts so as to face each other while sandwiching the second stacked part having the second width larger than the first width, a proper distance to the magnetic sensitive layer of the first stacked part can be assured. Consequently, a vertical bias magnetic field having both sufficient intensity and uniformity can be applied to the magnetic sensitive layer. Thus, stability of reading operation can be assured while adapting to higher recording density.

Particularly, in the case where the first width lies in the range from 0.05 µm to 0.1 µm, and the second width is in the range from 0.3 µm to 0.5 µm, or in the case where it is constructed so that the ratio between the thickness in the stacking direction of the first magnetic domain control part and the thickness in the stacking direction of the second magnetic domain control part satisfies a predetermined conditional expression (1), while improving uniformity in the first direction of the vertical bias magnetic field to be applied to the magnetic sensitive layer, the intensity can be further improved. Therefore, it can be sufficiently promoted to form the magnetic sensitive layer as a single magnetic domain, and more stabled reading operation can be assured.

In particular, in the case where center of thickness of the magnetic sensitive layer is in a position corresponding to center of thickness of the pair of first magnetic domain control parts in a second direction corresponding to a thickness direction of the magnetoresistive effect film, the vertical bias magnetic field can be applied to the magnetic sensitive layer more effectively, and the magnetic sensitive layer can be sufficiently promoted to be a single magnetic domain. Therefore, more stable reading operation can be assured.

In particular, in the case of providing the first and second shield layers which are disposed so as to face each other while sandwiching the magnetoresistive effect film and the pair of magnetic domain control films in the second direction and serve as a current path for passing current in the second direction to the magnetoresistive effect film, by narrowing the first width of the first stacked part as a part including the magnetic sensitive layer and specifying the effective track width, and assuring the second width of the second stacked part as a part which has high resistivity and does not contribute to a resistance change amount to be wider than the first width, the magnetoresistive change rate can be increased, and a signal magnetic field from a magnetic recording medium having a narrower recording track width can be detected at high sensitivity. Particularly, when a first boundary surface between the second shield layer and the first stacked part is flat in the first direction, and a second boundary surface between the second shield layer and the insulating film extends in the first direction in a plane extended from the first boundary surface or on the side closer to the first shield layer than the extended plane, passage of the magnetic flux to the second shield layer can be suppressed at the time of reproducing operation, PW50 of a smaller value is obtained, and the thin film magnetic head can be adapted to higher recording density. Moreover, in the case of forming a pair of intermediate insulating films between the pair of first magnetic domain control parts and the first stacked part, in the time of reading operation, sense current passes while being regulated to the width of the second stacked part reliably without expanding in the first direction. Thus, a resistance change in the sense current caused by a change in the magnetization direction of the magnetic sensitive layer can be detected at higher sensitivity.

Particularly, when the pair of first magnetic domain control parts and the pair of second magnetic domain control parts are constructed so as to have coercive forces which are different from each other, flexibility in designing such as dimensions and shapes increases. While assuring the effective track width corresponding to the narrow recording track width of a magnetic recording medium, a desired magnetic field distribution can be easily formed.

In the method of manufacturing the thin film magnetic head of the invention, particularly, in the step of forming an insulating film on a pair of magnetic domain control films, in the case of forming the insulating film at an angle lower than that in the case of forming the second magnetic domain control part by using sputtering, insulation between the pair of magnetic domain control films and the second shield layer can be obtained more reliably. Therefore, a narrower effective track width is specified with reliability, and the thin film magnetic head can be adapted to higher recording density.

Other and further objects, features and advantages of the invention will appear more fully from the following description.

DETAILED DESCRIPTION OF THE PREFERRED EMBODIMENTS

Embodiments of the invention will now be described in detail hereinbelow with reference to the drawings.

First Embodiment

First, the configuration of a thin film magnetic head according to a first embodiment of the invention will be described hereinbelow with reference to FIGS. 1 to 5.

Figure 1:
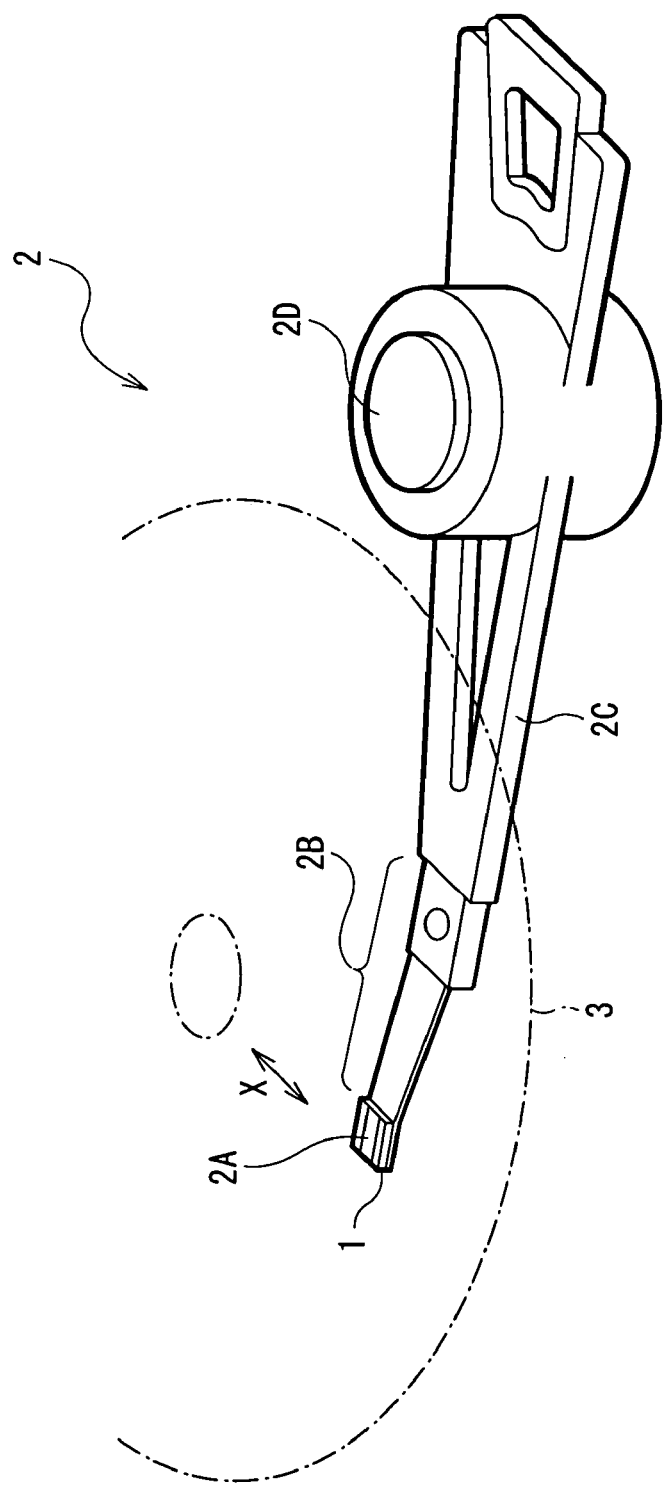
FIG. 1 is a perspective view showing the configuration of an actuator arm having a thin film magnetic head according to a first embodiment of the invention.

FIG. 1 shows the configuration of an actuator arm 2 having a thin film magnetic head 1 according to the embodiment. The actuator arm 2 is used in a hard disk drive or the like and has a slider 2A provided with the thin film magnetic head 1. The slider 2A is mounted at the tip of a slider supporting part 2B which is attached to an arm part 2C. The arm part 2C is rotatably supported by a spindle 2D and rotated by, for example, driving force of a voice coil motor (not shown). With such a configuration, the slider 2A moves in a direction (X direction) of crossing recording tracks along a recording surface (the under surface in FIG. 1) of a magnetic recording medium 3 such as a hard disk. The magnetic recording medium 3 rotates, for example, in a direction (Z direction) almost orthogonal to the X direction. In such a manner, information is recorded on the magnetic recording medium 3 or the recorded information is read by the rotation of the magnetic recording medium 3 and the movement of the slider 2A.

Figure 2:
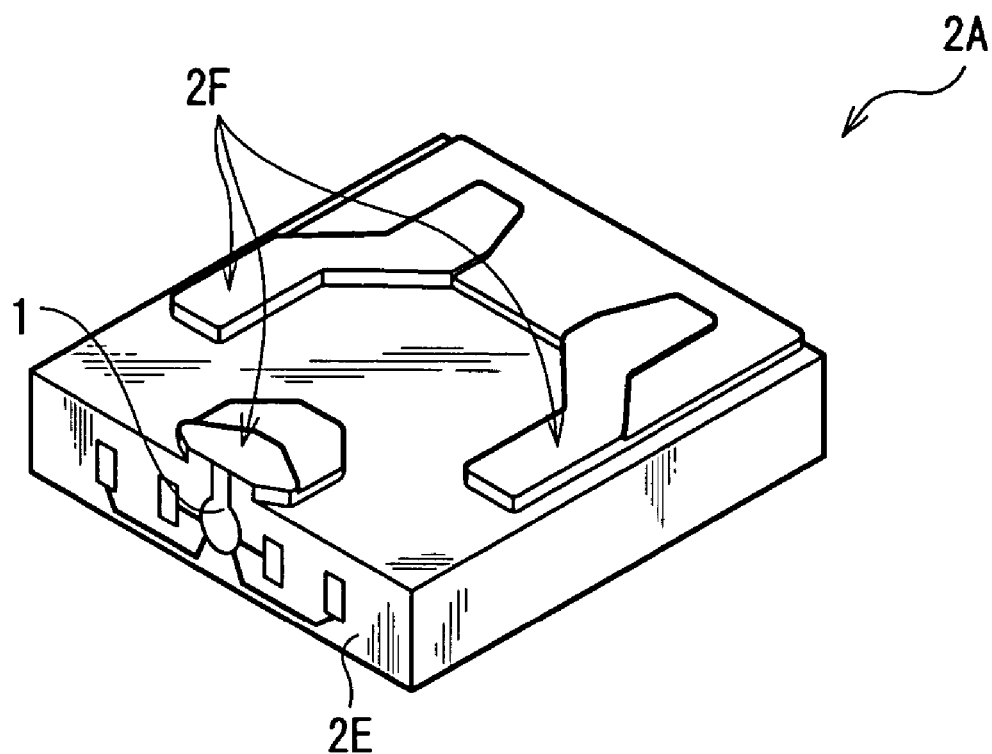
FIG. 2 is a perspective view showing the configuration of a slider in the actuator arm illustrated in FIG. 1.
Figure 2:
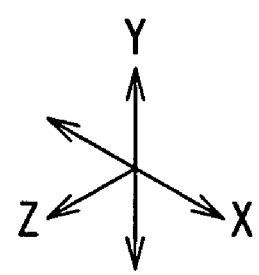

FIG. 2 shows the configuration of the slider 2A illustrated in FIG. 1. The slider 2A has a block-shaped base 2E made of, for example, altic ($Al_2O_3$.TiC). The base 2E is formed, for example, almost in a hexahedron shape and is disposed so that one surface of the base 2E faces a recording surface of the magnetic recording medium 3 in a close distance. The surface which faces the recording surface of the magnetic recording medium 3 is a recording medium facing surface (also called an air bearing surface) 2F. When the magnetic recording medium 3 rotates, by a lift force caused by air current generated between the recording surface and the recording medium facing surface 2F, the slider 2A floats from the recording surface along the direction (Y direction) of facing the recording surface, and a predetermined gap is created between the recording medium facing surface 2F and the magnetic recording medium 3. In one side surface facing the recording medium facing surface 2F of the base 2E, the thin film magnetic head 1 is provided.

Figure 3:
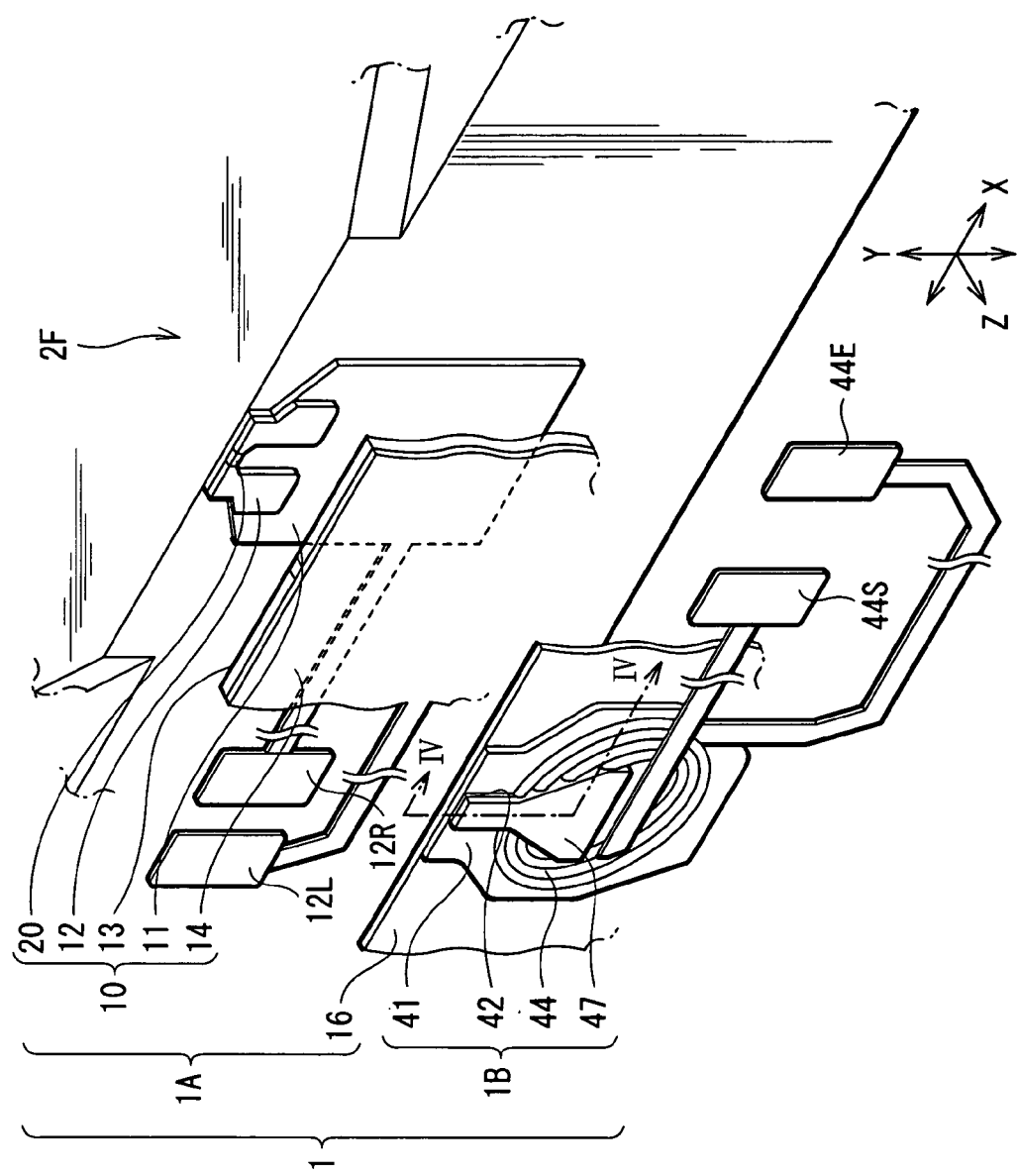
FIG. 3 is an exploded perspective view showing the configuration of the thin film magnetic head according to the first embodiment of the invention.
Figure 4:
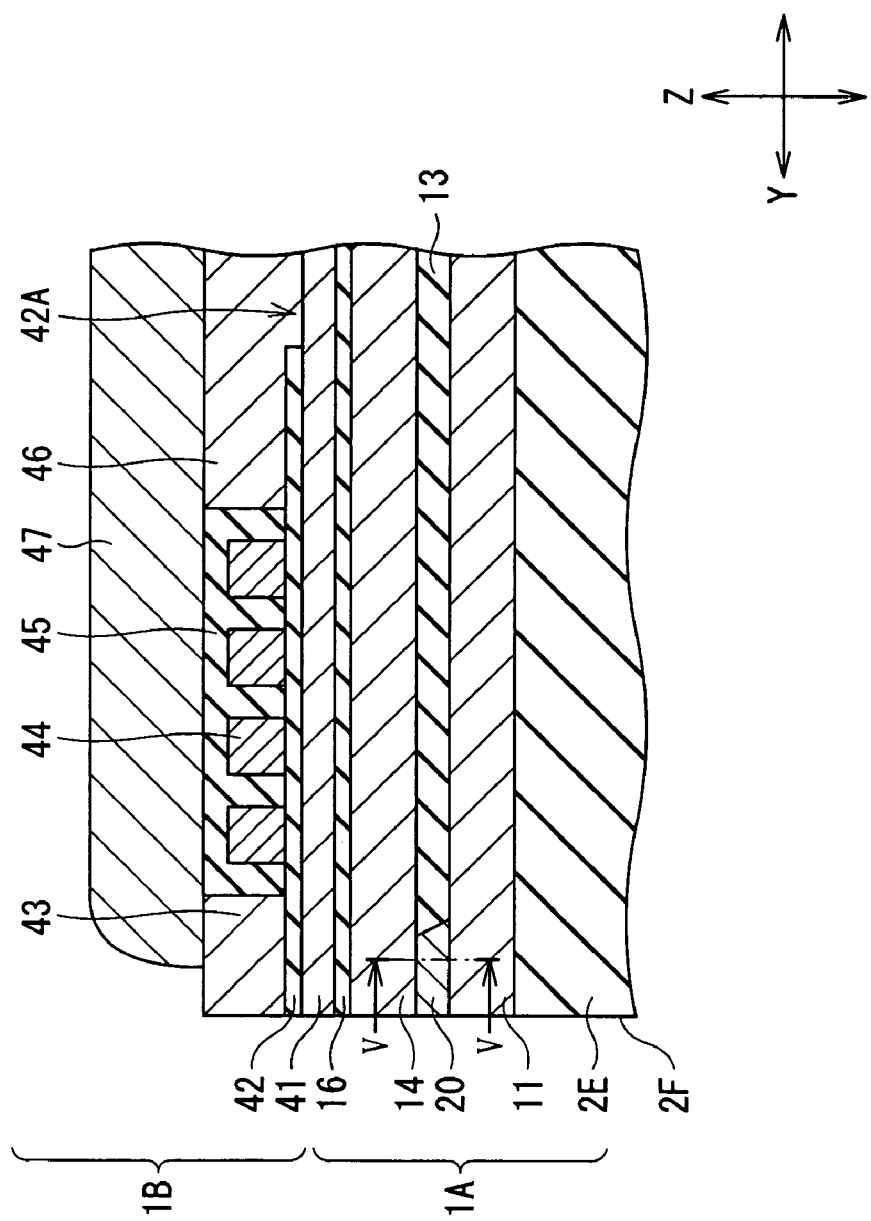
FIG. 4 is a cross section illustrating a structure in the direction of the arrow along IV—IV line of the thin film magnetic head shown in FIG. 3.

FIG. 3 is an exploded perspective view showing the configuration of the thin film magnetic head 1. FIG. 4 is a cross section showing the structure in the direction of the arrow taken along line IV—IV of FIG. 3. The thin film magnetic head 1 is obtained by integrally constructing a reproduction head part 1A for reproducing magnetic information recorded on the magnetic recording medium 3 and a recording head part 1B for recording magnetic information onto a recording track of the magnetic recording medium 3.

As shown in FIGS. 3 and 4, the reproduction head part 1A has a CPP (Current Perpendicular to the Plane)-GMR (Giant Magnetoresistive) structure constructed so that sense current flows in the stacking direction and is constructed by disposing, for example, a magnetoresistive effect element (hereinbelow, called MR element) 10 and an insulating layer 16 covering the MR element 10 on the base 2E. The MR element 10 has a structure in which a lower shield layer 11, a magnetoresistive effect film (hereinbelow, called MR film) 20, a pair of magnetic domain control films 12, an insulating film 13, and an upper shield layer 14 are stacked in order from the side of the base 2E. The thickness of each of the lower shield layer 11 and the upper shield layer 14 is, for example, 1 μm to 3 μm and is made of a magnetic metal material such as nickel iron alloy (NiFe) or the like. The lower shield layer 11 and the upper shield layer 14 are used to prevent exertion of an influence of an unnecessary magnetic field onto the MR film 20. Further, the lower shield layer 11 and the upper shield layer 14 are connected to pads 12R and 12L and have a function as a current path for passing current in the stacking direction (Z direction) to the MR film 20. The MR film 20 is a spin valve (SV) type MR film having a multilayer structure including a magnetic material and has a function of reading information recorded on the magnetic recording medium 3. The pair of magnetic domain control films 12 are disposed so as to face each other while sandwiching the MR film 20 along the direction (X direction) corresponding to the recording track width direction of the magnetic recording medium 3. The reproduction head part 1A reads recorded information by using a phenomenon that electric resistance of the MR film 20 changes according to a signal magnetic field from the magnetic recording medium 3. The detailed configurations of the MR film 20 and the magnetic domain control film 12 will be described later. The thickness of each of the insulating film 13 and the insulating layer 16 is, for example, 10 nm to 100 nm and is made of an insulating material such as aluminum oxide ($Al_2O_3$) or aluminum nitride (AlN). The insulating film 13 is used mainly for electrical insulation between the lower shield layer 11 and the upper shield layer 14, and the insulating layer 16 is used for electrical insulation between the reproduction head part 1A and the recording head part 1B.

The configuration of the recording head part 1B will now be described. As shown in FIGS. 3 and 4, the recording head part 1B is formed on the insulating layer 16 of the recording head part 1A and has a bottom magnetic pole 41, a recording gap layer 42, a pole chip 43, a coil 44, an insulating layer 45, a coupling part 46, and a top magnetic pole 47.

The bottom magnetic pole 41 is made of, for example, a magnetic material such as NiFe and is formed on the insulating layer 16. The recording gap layer 42 is made of an insulating material such as $Al_2O_3$ and is formed on the bottom magnetic pole 41. The recording gap layer 42 has an opening 42A for forming a magnetic path in a position corresponding to a center portion of the coil 44 in the XY plane. On the recording gap layer 42, the pole chip 43, the insulating layer 45, and the coupling part 46 are formed in the same plane in order from the side of the recording medium facing surface 2F. The coil 44 is buried in the insulating layer 45. The coil 44 is formed on the recording gap layer 42 around the opening 42A as a center and is made of, for example, copper (Cu) or gold (Au). Both ends of the coil 44 are connected to electrodes 44S and 44E. The top magnetic pole 47 is made of a magnetic material such as NiFe and is formed on the recording gap layer 42, pole chip 43, insulating layer 45, and coupling part 46. The coupling part 46 is in contact with and is magnetically coupled with the bottom magnetic pole 41 via the opening 42A. Although not shown, an overcoat layer made of $Al_2O_3$ or the like is formed so as to cover the entire top surface of the recording head part 1B.

The recording head part 1B having such a configuration generates a magnetic flux in the magnetic path constructed mainly by the bottom magnetic pole 41 and the top magnetic pole 47 by the current flowing in the coil 44 and magnetizes the magnetic recording medium 3 by the signal magnetic field generated around the recording gap layer 42 to record information.

Figure 5:
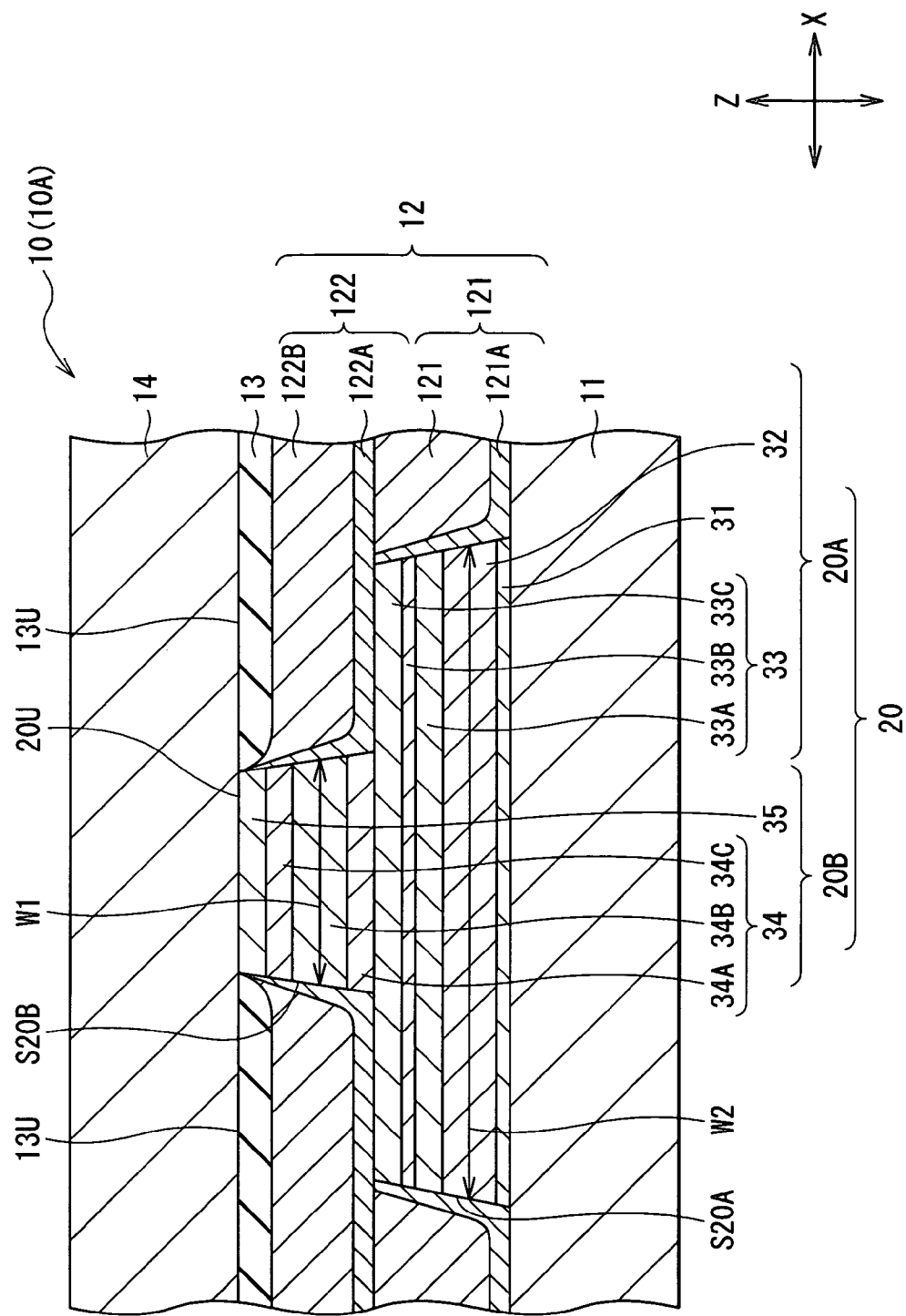
FIG. 5 is a cross section of a main portion showing a structure seen from the direction of the arrow V of the thin film magnetic head shown in FIG. 4.

The detailed configuration of the MR film 20 and the magnetic domain control film 12 constructing the MR element 10A in the thin film magnetic head 1 of the embodiment will be described hereinbelow with reference to FIG. 5. FIG. 5 is a cross section showing the structure seen from the direction of the arrow V of the thin film magnetic head 1 of FIG. 4.

As shown in FIG. 5, the MR film 20 has a lower layer part 20A and an upper layer part 20B in order from the side of the lower shield layer 11. The upper layer part 20B has a magnetic sensitive layer 34 of which magnetization direction changes in accordance with a signal magnetic field from the magnetic recording medium 3 and extends so that the width in the X direction corresponding to the recording track width direction of the magnetic recording medium 3 becomes first width W1. On the other hand, the lower layer part 20A has an antiferromagnetic layer 32 and extends so that the width in the X direction becomes second width W2 larger than the first width W1. The upper layer part 20B corresponds to a concrete example of a "first stacked part" in the invention, and the lower layer part 20A corresponds to a concrete example of a "second stacked part" in the invention. The X direction corresponds to a concrete example of a "first direction" in the invention. Further, the antiferromagnetic layer 32 corresponds to a concrete example of a "first antiferromagnetic layer" in the invention. Most preferably, an end surface S20B of the upper layer part 20B and an end surface S20A of the lower layer part 20A are formed perpendicular to the X direction. It is assumed here that the first width W1 denotes average width of the magnetic sensitive layer 34, and the second width W2 denotes average width of the antiferromagnetic layer 32.

The lower layer part 20A has a structure in which an under layer 31, the antiferromagnetic layer 32, and a magnetization direction pinned layer 33 are formed in this order on the lower shield layer 11. The under layer 31 is, for example, made of tantalum (Ta) or the like and has a thickness of 5 nm. The antiferromagnetic layer 32 is made of, for example, an antiferromagnetic material such as platinum manganese alloy (PtMn), iridium manganese alloy (IrMn), or the like and functions as a so-called pinning layer for pinning the magnetization direction of the magnetization direction pinned layer 33. Further, the magnetization direction pinned layer 33 has a synthetic structure which is, for example, a three-layer structure in which a nonmagnetic layer 33B made of copper, gold or the like is formed between two ferromagnetic layers 33A and 33C made of cobalt iron alloy (CoFe) or the like. In the magnetization direction pinned layer 33, the magnetization direction of the ferromagnetic layers 33A and 33C is pinned by the antiferromagnetic layer 32. The magnetization direction pinned layer 33 corresponds to a concrete example of a "first magnetization direction pinned layer" in the invention.

The upper layer part 20B is formed in an almost center portion in the X direction on the magnetization direction pinned layer 33 and has the magnetic sensitive layer 34 and a protection layer 35 in order from the side of the lower layer part 20A. The magnetic sensitive layer 34 has a three-layer structure in which a ferromagnetic layer 34B made of CoFe or the like is formed between nonmagnetic layers 34A and 34C made of copper or the like. The thickness of each of the nonmagnetic layers 34A and 34C and the ferromagnetic layer 34B is, for example, 3 nm. The direction of magnetization of the ferromagnetic layer 34B in the magnetic sensitive layer 34 changes according to a signal magnetic field from the magnetic recording medium 3. Further, the protection layer 35 is made of copper and has a thickness of, for example, 5 nm.

The magnetic domain control film 12 has a second magnetic domain control part 121 and a first magnetic domain control part 122 which are provided in order from the side of the lower shield layer 11. The second magnetic domain control parts 121 are disposed so as to face each other at an interval corresponding to the second width W2 while sandwiching the lower layer part 20A and apply a vertical bias magnetic field to the magnetic sensitive layer 34 in the upper layer part 20B. On the other hand, the first magnetic domain control parts 122 are disposed so as to face each other at an interval corresponding to the first width W1 while sandwiching the upper layer part 20B and apply a vertical bias magnetic field to the magnetic sensitive layer 34. The MR element 10A is constructed so that the first magnetic domain control part 122 is in contact with the upper layer part 20B.

More specifically, the second magnetic domain control part 121 has an under layer 121A formed so as to cover the end surface S20A of the lower layer part 20A and the lower shield layer 11, and a magnetic domain control layer 121B formed on the under layer 121A. The first magnetic domain control part 122 has an under layer 122A formed so as to cover the end surface S20B of the upper layer part 20B, the under layer part 20A and the second magnetic domain control part 121, and a magnetic domain control layer 122B formed on the under layer 122A. The under layers 121A and 122A are made of chrome titanium alloy (CrTi) and function to promote growth of the magnetic domain control layers 121B and 122B in a manufacturing process to be described later. Desirably, each of the under layer 121A of a portion covering the end surface S20A of the lower layer part 20A and the under layer 122A of a portion covering the end surface S20B of the upper layer part 20B is formed as thin as possible. More preferably, the end surfaces S20A and S20B are not covered at all with the under layers 121A and 122A. The magnetic domain control layers 121B and 122B are made of, for example, cobalt platinum alloy (CoPt) or the like, promotes formation of a single magnetic domain so that the direction of the magnetic domain of the ferromagnetic layer 34B in the magnetic sensitive layer 34 is adjusted, and function to suppress occurrence of Barkhausen noise.

In the MR element 10A, desirably, the second width W2 is in a range from a width which is three times as large as the first width W1 to a width which is tenth times as large as the first width W1. More desirably, the first width W1 is in the range from 0.05 μm to 0.1 μm, and the second width W2 is in the range from 0.3 μm to 0.5 μm. In such a numerical value range, the MR element 10A can be used to read information on a magnetic recording medium having high recording density, and the intensity distribution of the vertical bias magnetic field to be applied to the magnetic sensitive layer 34 can be made flatter in the X direction. In this case, it is difficult to set the second width W2 to a value less than 0.3 μm from the viewpoint of manufacture. Even if it can be achieved in manufacture, uniformity in the intensity distribution in the X direction is lost when the second width W2 is less than 0.3 μm. On the other hand, when the second width W2 is set to a value larger than 0.5 μm, it is difficult to effectively improve the intensity of the magnetic field.

Further, it is desirable that the ratio between the thickness in the stacking direction of the first magnetic domain control part 122 and the thickness in the stacking direction of the second magnetic domain control part 121 satisfy the following conditional expression (1). T1 denotes the thickness in the stacking direction of the first magnetic domain control part and T2 denotes the thickness in the stacking direction of the second magnetic domain control part.

$$1/4 \leq T1/T2 \leq 2/3 \tag{1}$$

By setting the ratio in such a numerical value range, while improving uniformity in the X direction of the vertical bias magnetic field applied to the magnetic sensitive layer 34, the intensity of the vertical bias magnetic field can be also improved. In the case where the thickness ratio is below the lower limit of the conditional expression (1), it is difficult to apply a vertical bias magnetic field of sufficient intensity to promote formation of a signal magnetic domain of the magnetic sensitive layer 34. On the other hand, in the case where the thickness ratio exceeds the upper limit, it becomes difficult to sufficiently assure a flat portion in the magnetic field distribution in the X direction. In this case, it is particularly desirable that the total of the thickness T1 and the thickness T2 be 50 nm or less.

In addition, it is desirable that, in the thickness direction (Z direction) of the MR film 20, the center of thickness of the magnetic sensitive layer 34 is in a position corresponding to the center of thickness of the first magnetic domain control part 122. In such a manner, the vertical bias magnetic field can be applied to the magnetic sensitive layer 34 more effectively, and formation of a single magnetic domain can be sufficiently promoted. The Z direction corresponds to a concrete example of a "second direction" in the invention.

The configuration of the lower and upper shield layers 11 and 14 and the MR film 20 will be further described. As shown in FIG. 5, the lower and upper shield layers 11 and 14 are disposed so as to face each other while sandwiching the MR film 20 and the pair of magnetic domain control films 12 in the Z direction. At the time of reading magnetic information of the magnetic recording medium 3, the lower and upper shield layers 11 and 14 function as a current path for passing sense current in the Z direction to the MR film 20. Specifically, the lower shield layer 11 is in contact with the lower layer part 20A and the pair of magnetic domain control films 12, and the upper shield layer 14 is in contact with the upper layer part 20B and is insulated from the pair of magnetic domain control films 12 by the insulating film 13. The interval in the X direction of the insulating films 13 coincides with the first width W1. A boundary surface 20U between the upper shield layer 14 and the upper layer part 20B is flat in the X direction, and a pair of boundary surfaces 13U between the upper shield layer 14 and the pair of insulating films 13 extend on a plane extended from the boundary surface 20U.

A reproducing operation of the MR element 10A and the thin film magnetic head 1 constructed as described above will now be described with reference to FIGS. 3 and 5.

The thin film magnetic head 1 reads information recorded on the magnetic recording medium 3 by the reproduction head part 1A. At the time of reading recorded information, the recording medium facing surface 2F faces the recording surface of the magnetic recording medium 3. In this state, a signal magnetic field from the magnetic recording medium 3 reaches the MR film 20. To the MR film 20, sense current is preliminarily passed in the stacking direction (Z direction) via the lower and upper shield layers 11 and 14. Specifically, the sense current flows in the MR film 20 in order from the under layer 31, antiferromagnetic layer 32, magnetization direction pinned layer 33, magnetic sensitive layer 34, and protection layer 35 or in the opposite order. In the MR film 20, relative directions of magnetization change between the magnetic sensitive layer 34 of which magnetization direction changes according to a signal magnetic field and the magnetization direction pinned layer 33 of which magnetization direction is pinned to a predetermined direction by the antiferromagnetic layer 32 and is not influenced by the signal magnetic field. As a result, a change in spin dependency scattering of conduction electrons occurs, and a change occurs in electric resistance of the MR film 20. The change in the electric resistance causes a change in the sense current. By detecting the current change, information recorded on the magnetic recording medium 3 is read.

The action of the thin film magnetic head 1 of the embodiment will now be described.

As described above, the magnetic resistance change rate (MR rate) ΔR/R of the conventional CPP-GMR element is lower as compared with the other MR elements and is demanded to be improved. To increase the MR rate ΔR/R, a method of increasing the resistance change amount ΔR and also a method of decreasing the resistance value R of an MR element as a whole are considered. To reduce the resistance value of sense current flowing in the stacking direction of the MR film, there is a method of simply enlarging an area of formation of the MR film. The method, however, cannot address reduction in the recording track width accompanying increase in recording density. In contrast, the thin film magnetic head 1 having the MR element 10A of the embodiment can address reduction in the recording track width. Moreover, the resistance value R of a portion which does not contribute to increase in the resistance change amount ΔR can be reduced without decreasing the resistance change amount ΔR. Concretely, the upper layer part 20B including the magnetic sensitive layer 34 has the first width W1 to specify a narrower effective track width, thereby addressing the recording track width of higher recording density. The lower layer part 20A including the antiferromagnetic layer 32 which does not contribute so much to increase in the resistance change amount ΔR has the second width W2 larger than the first width W1 corresponding to the width of the magnetic sensitive layer 34, thereby enabling the resistance value R of the entire MR element to be further reduced. Therefore, the MR rate ΔR/R can be increased, and a signal magnetic field can be detected at higher sensitivity. The higher recording density means decrease in PW50 and MRWu. PW50 denotes a half breadth of a reproduction waveform peak and is closely related to recording density in the circumferential direction (BPI: Bit Per Inch) in a magnetic recording medium. MRWu is a parameter related to recording track density (TPI: Track Per Inch).

Further, by dividing the pair of magnetic domain control films 12 into a pair of first magnetic domain control parts 122 provided at an interval corresponding to the first width W1 of the upper layer part 20B and a pair of second magnetic domain control parts 121 provided at an interval corresponding to the second width W2 of the lower layer part 20A, thereby enabling the distance between the magnetic sensitive layer 34 and the pair of first magnetic domain control parts 122 to be shortened, so that a vertical bias magnetic field having sufficient uniformity in the X direction can be applied. By giving proper thickness to the pair of second magnetic control parts 121 apart from the magnetic sensitive layer 34 more than the pair of first magnetic domain control parts 122, a stronger vertical bias magnetic field can be applied to the magnetic sensitive layer 34.

Figure 20:
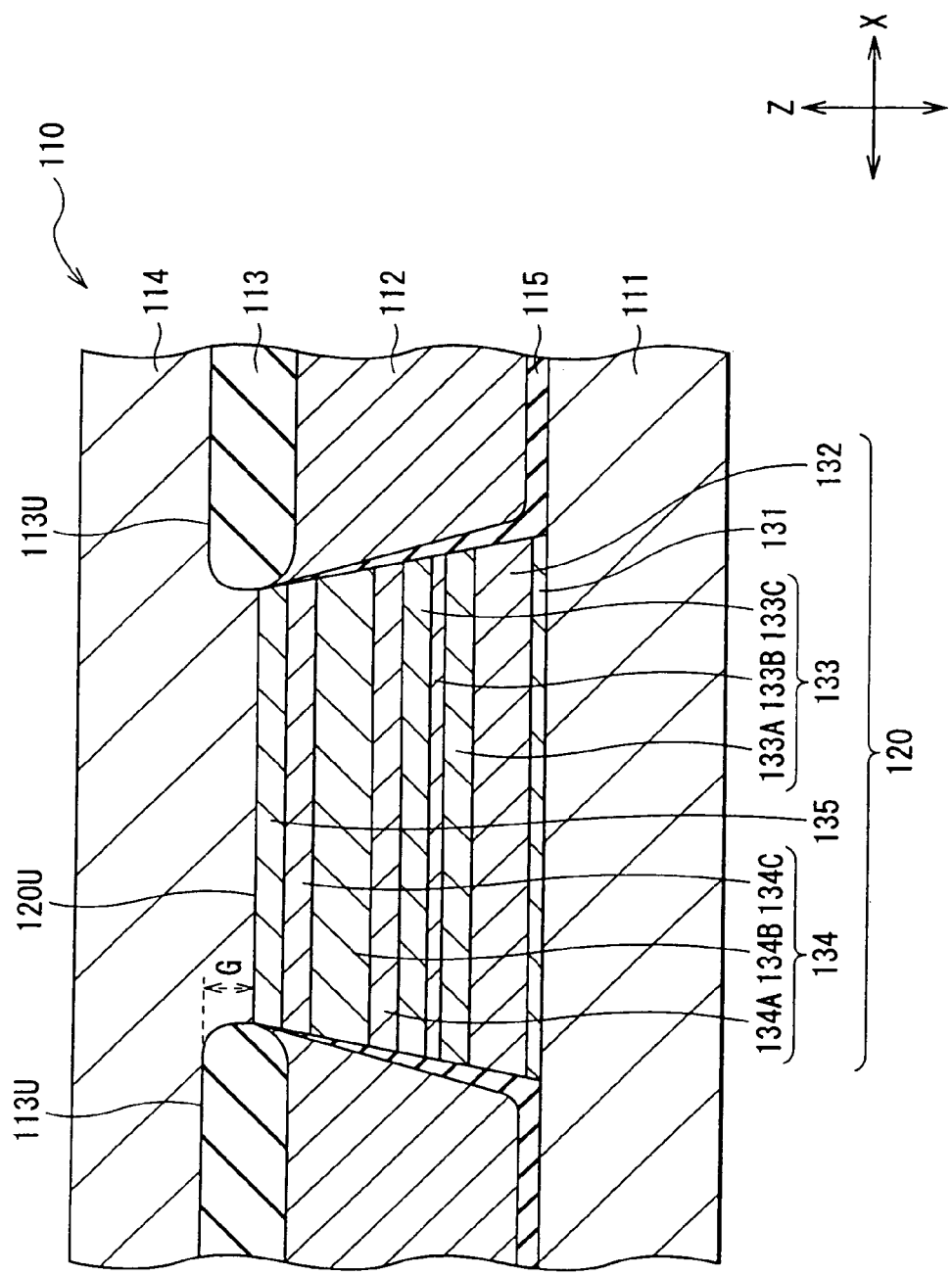
FIG. 20 is a cross section of a main portion showing the configuration of a conventional thin film magnetic head.

The upper shield layer 14 is in contact with the upper layer part 20B and is isolated from the pair of magnetic domain control films 12 by the insulating films 13, and the interval in the X direction of the insulating films 13 coincides with the first width W1, so that the sense current passes the upper layer part 20B of the MR film 20 having the first width W1, and the effective track width corresponding to the first width W1 is specified. Further, the boundary surface 20U between the upper shield layer 14 and the upper layer part 20B is flat in the X direction, and a pair of boundary surfaces 13U between the upper shield layer 14 and the pair of insulating films 13 extend along the plane extended from the boundary surface 20U, that is, extend in the same plane. In the case where there is a gap G in the Z direction as in the conventional MR element 110 shown in FIG. 20, at the time of reproducing operation, a magnetic flux generated by the signal magnetic field enters the upper shield layer 114, so that PW50 increases. In the MR element 10A of the embodiment, however, the boundary surfaces 13U and 20U exist in the same plane, and no gap exists on the side opposite to the MR film 20 in the Z direction. Consequently, the bit length is specified by the width corresponding to the thickness of the MR film 20, and smaller PW50 is obtained. The above-described effects are obtained not only in the case where the boundary surfaces 13U and 20U exist in the same plane but also in the case where the pair of boundary surfaces 13U extend in the X direction on the side closer to the lower shield layer 11 than the plane extended from the boundary surface 20U. The boundary surface 20U is a concrete example corresponding to a "first boundary surface" of the invention, and the boundary surface 13U is a concrete example corresponding to a "second boundary surface" of the invention.

As described above, in the thin film magnetic head 1 of the embodiment, while narrowing the first width W1 of the upper layer part 20B including the magnetic sensitive layer 34 in the MR film 20, the second width W2 of the lower layer part 20A as a part which does not contribute to the resistance change amount ΔR in the MR film 20 is assured wide. With such a configuration, the resistance value of the lower layer part 20A can be reduced only by the amount of the second width W2 in the lower layer part 20A, which is larger than the first width W1. Thus, the resistance value R of the whole MR film 20 can be reduced. On the other hand, the resistance change amount ΔR of the whole MR film 20 hardly changes even in the case where the second width W2 is larger than the first width W1 as compared with the case where the second width W2 is equal to the first width W1. As a result, the MR rate can be increased while making the first width W1 in the upper layer part 20B adapted to the narrower recording track width. Therefore, information can be read with high sensitivity from the magnetic recording medium 3 having a narrower recording track width. Further, the first magnetic domain control parts 122 sandwich the upper layer part 20B in correspondence with the first width W1, so that the first magnetic domain control parts 122 can be provided so as to be adjacent to the upper layer part 20B. In addition, by disposing the pair of second magnetic domain control parts 121 so as to sandwich the lower layer part 20A, a proper distance to the magnetic sensitive layer 34 of the upper layer part 20B can be assured. Therefore, the vertical bias magnetic field having sufficient intensity and uniformity can be applied to the magnetic sensitive layer 34. As a result, formation of a single magnetic domain in the entire magnetic sensitive layer 34 is further promoted, so that reading operation can be performed more stably. In addition, it is constructed so that the boundary surface 20U and the pair of boundary surfaces 13U are in the same plane, so that entering of the magnetic flux generated by the signal magnetic field to the upper shield layer 14 can be suppressed. As a result, the shorter bit length is specified and, mainly, PW50 is improved, so that the thin film magnetic head can be adapted to higher recording density.

A method of manufacturing the thin film magnetic head 1 will now be described with reference to FIGS. 3 to 12. The portion of forming the MR element 10A will be mainly described in detail.

The manufacturing method according to the embodiment includes a step of forming the lower shield layer 11 on the substrate 2E, a step of forming a multilayer film 201 including a structure in which the antiferromagnetic layer 32, the magnetization direction pinned layer 33, and the magnetic sensitive layer 34 are stacked on the lower shield layer 11 in order from the side of the lower shield layer 11, a step of selectively forming a photoresist pattern 41A on the multilayer film 201, a step of forming a multilayer film pattern 202 by selectively etching the multilayer film 201 by using the photoresist pattern 41A as a mask, a step of forming the second magnetic domain control part 121 by forming a ferromagnetic film on the entire surface and, after that, removing the photoresist pattern 41A, a step of selectively forming a photoresist pattern 41B so as to protect a region corresponding to the portion which specifies the recording track width, a step of etching the multilayer film pattern 202 in a non-protected region by using the photoresist pattern 41B as a mask so as to remove at least all of the magnetic sensitive layer 34 in the Z direction and leave at least a part of the antiferromagnetic layer 32 in the Z direction, thereby completing formation of the MR film 20 including the upper layer part 20B having the first width W1 as the width in the X direction and the lower layer part 20A having the second width W2 larger than the first width W1 as the width in the X direction, a step of forming the first magnetic domain control part 122 in the region etched in the step of completing formation of the MR film 20, thereby completing formation of a pair of magnetic domain control films 12, a step of forming the insulating film 13 on the pair of magnetic domain control films 12, and a step of removing the photoresist pattern 41B and, after that, forming the upper shield layer 14 on the entire surface. Each of the steps will be described in detail hereinbelow.

Figure 6:
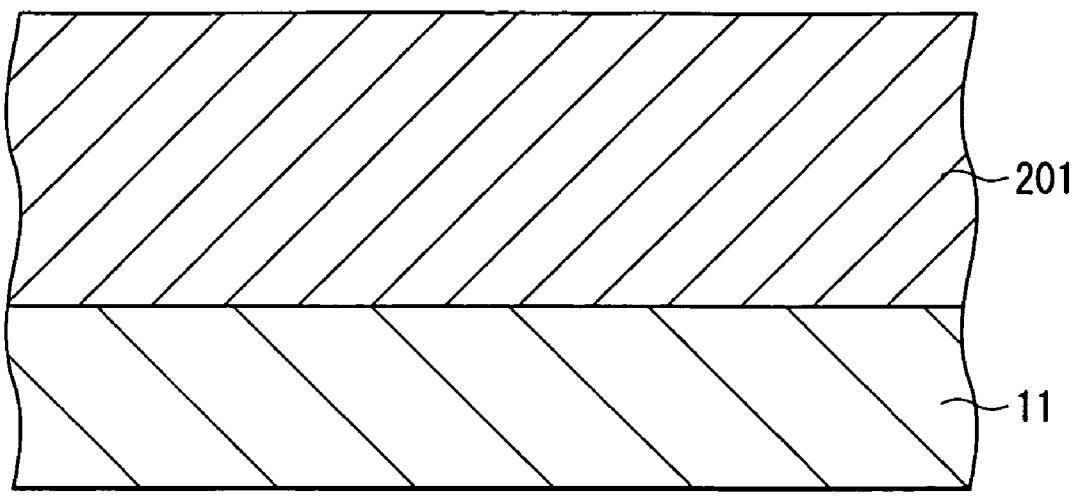
FIG. 6 is a cross section of a main portion showing a process in a method of manufacturing the thin film magnetic head illustrated in FIG. 5.

First, as shown in FIG. 6, the multilayer film 201 is formed on the entire surface of the lower shield layer 11 formed on one side surface of the substrate 2E. Concretely, the under layer 31, antiferromagnetic layer 32, magnetization direction pinned layer 33, non-magnetic layer 34, magnetic sensitive layer 35, and protection layer 36 are stacked in order by using sputtering or the like. The multilayer film 201 finally becomes the MR film 20. In FIGS. 6 to 12, the internal structures of the MR film 20 and the multilayer film 201 and the multilayer film pattern 202 (to be described later) which are in the process of forming the MR film 20 are not shown, and each of the components has the internal structure corresponding to the MR film 20 shown in FIG. 5.

Figure 7:
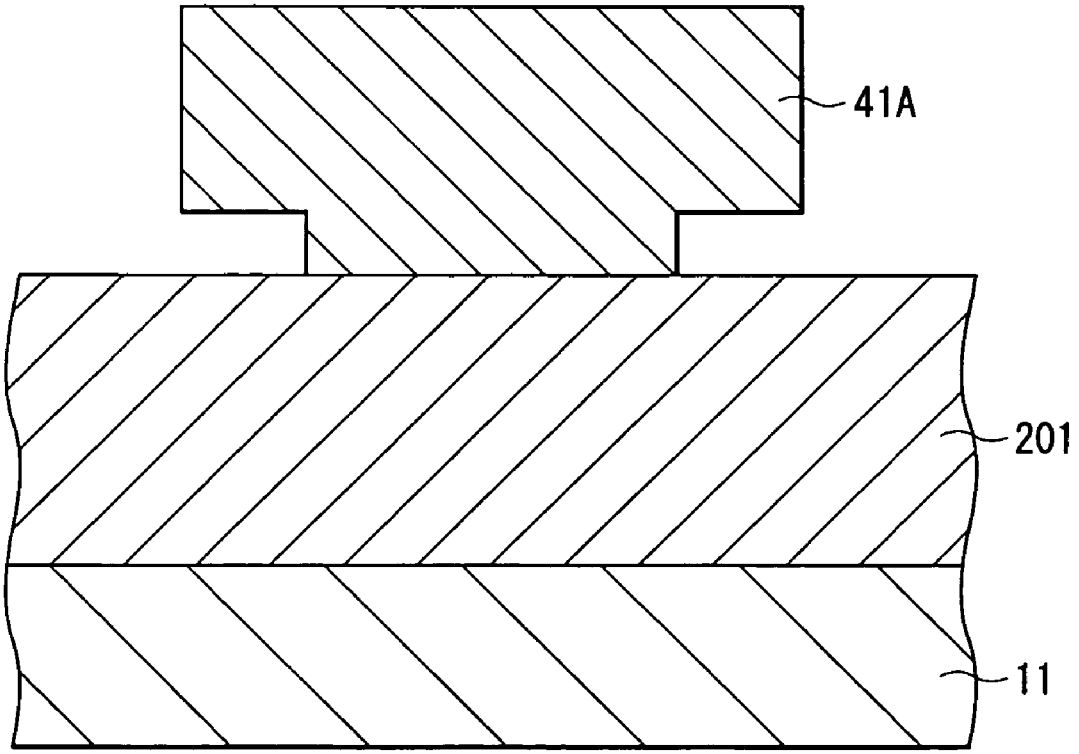
FIG. 7 is a cross section of a main portion showing a process subsequent to FIG. 6.

Subsequently, as shown in FIG. 7, the photoresist pattern 41A is selectively formed to have width corresponding to the second width W2 of the lower layer part 20A on the multilayer film 201. In this case, an under cut may be formed by partially removing an end portion of the photoresist pattern 41A by using a predetermined solvent.

Figure 8:
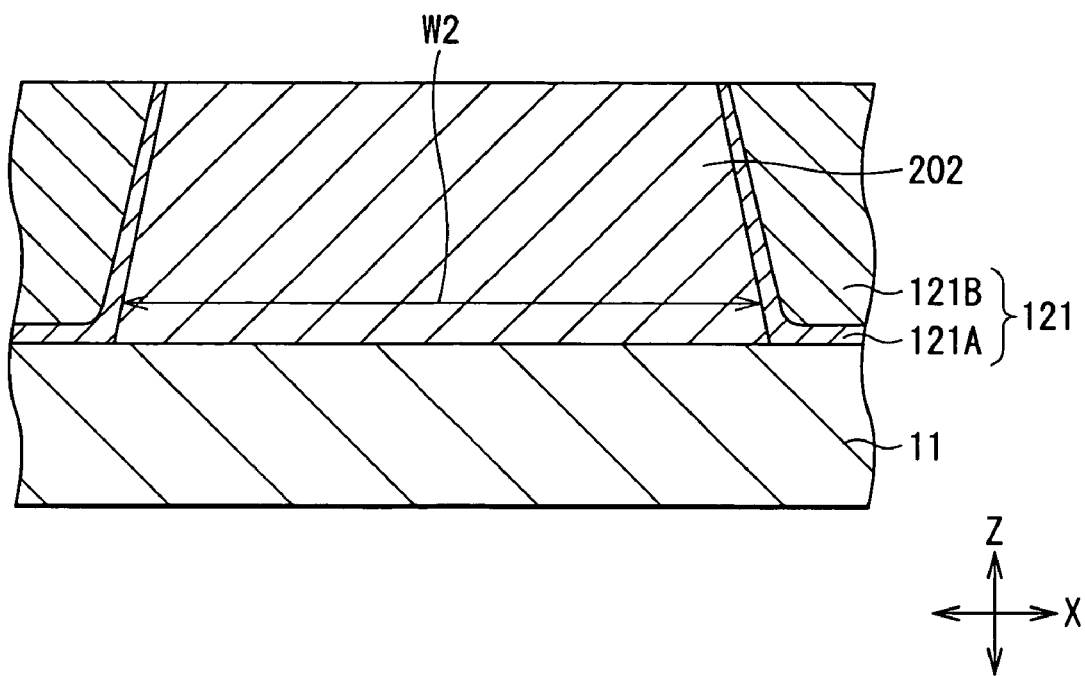
FIG. 8 is a cross section of a main portion showing a process subsequent to FIG. 7.

After that, the multilayer film 201 is selectively removed by using the photoresist pattern 41A as a mask by dry etching such as ion milling or RIE. In this case, dry etching is performed to reach the lower shield layer 11. By the dry etching, as shown in FIG. 8, the multilayer film pattern 202 having the second width W2 is formed. The second width W2 refers to an average width in the X direction in the antiferromagnetic layer 32. After forming the multilayer film pattern 202, the pair of second magnetic domain control parts 121 are formed on both sides of the multilayer film pattern 202 in the X direction. Concretely, for example, a multilayered ferromagnetic film to become the under layer 121A and the magnetic domain control layer 121B is formed on an entire surface by sputtering or the like. Subsequently, by lifting off the photoresist pattern 41A, the multilayer film pattern 202 and the pair of second magnetic domain control parts 121 constructed by. the under layer 121A and the magnetic domain control layer 121B and facing each other while sandwiching the multilayer film pattern 202 appear. In this case, it is sufficient for the under layer 121A to cover at least the top surface of the lower shield layer 11 exposed on both sides of the multilayer film pattern 202 by dry etching. Rather, it is desirable not to cover the end surfaces of the mutilayer film pattern 202 as much as possible.

Figure 9:
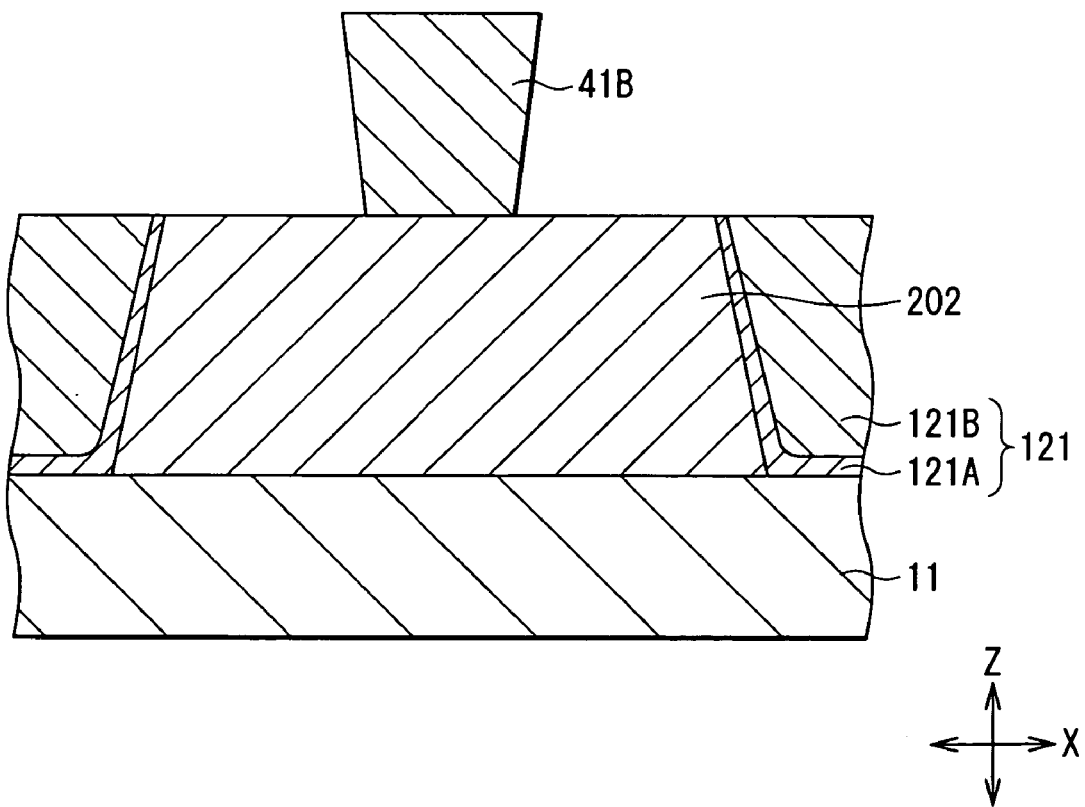
FIG. 9 is a cross section of a main portion showing a process subsequent to FIG. 8.
Figure 10:
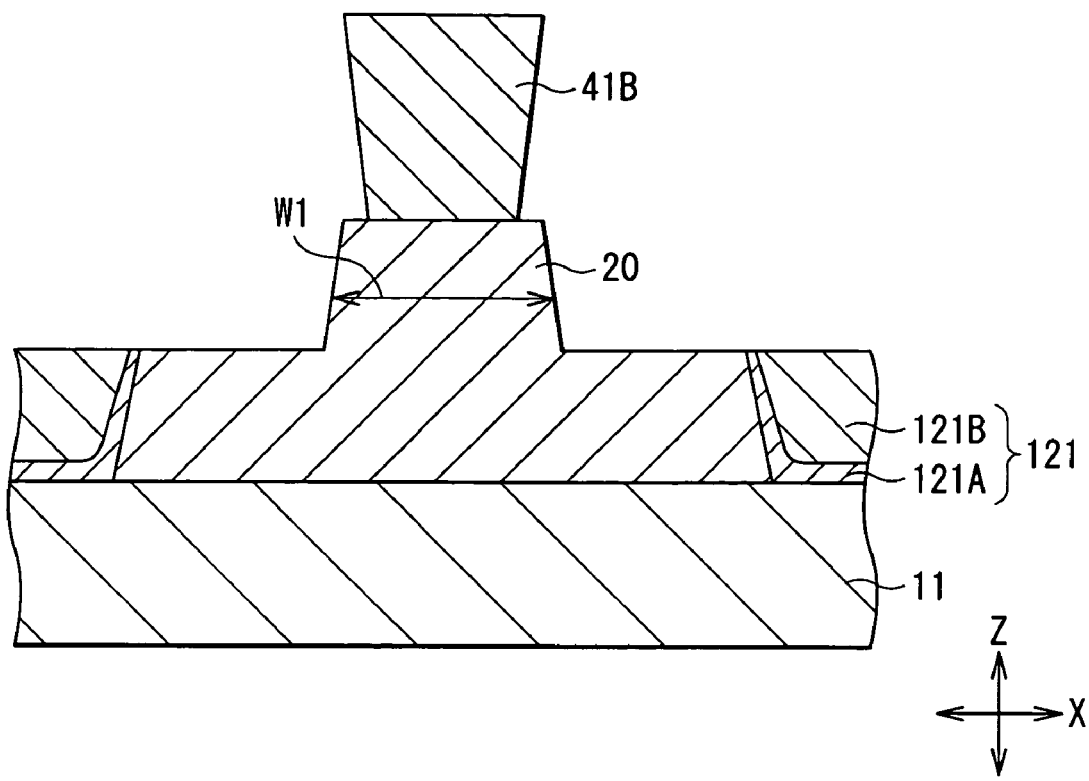
FIG. 10 is a cross section of a main portion showing a process subsequent to FIG. 9.

Subsequently, as shown in FIG. 9, the photoresist pattern 41B is formed on the multilayer film pattern 202. In this case, it is desirable to form the photoresist pattern 41B in a center portion in the X direction of the multilayer film pattern 202. After that, as shown in FIG. 10, by etching a part of the multilayer film pattern 202 in the non-protection region with the photoresist pattern 41B as a mask, formation of the MR film 20 including the upper layer part 20B having the first width W1 as the width in the X direction and the lower layer part 20A having the second width W2 larger than the first width W1 as the width in the X direction is completed. In this case, etching is carried out so as not to reach the lower shield layer 11 but so as to reach the top face of the ferromagnetic layer 33C in the magnetization direction pinned layer 33. In the etching process, it is important to completely remove at least the magnetic sensitive layer 34 and not to remove the antiferromagnetic layer 33 as much as possible. The second magnetic domain control part 121 is removed to a depth corresponding to the upper layer part 20B. The first width W1 refers to the average width in the X direction in the magnetic sensitive layer 34.

Figure 11:
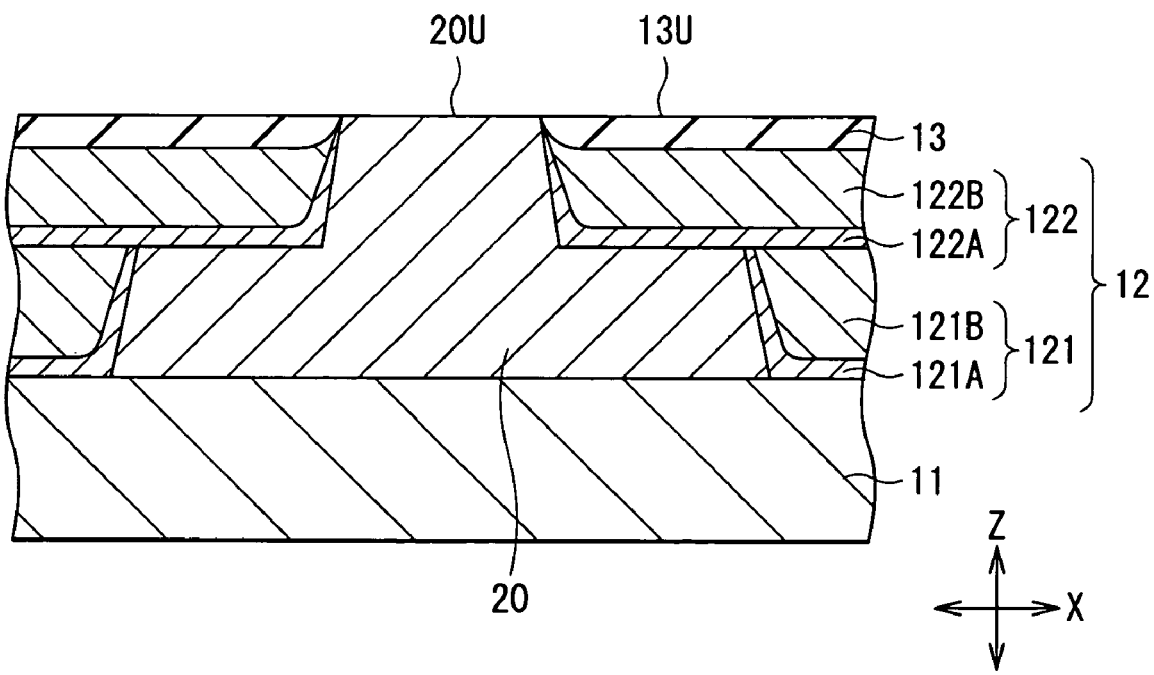
FIG. 11 is a cross section of a main portion showing a process subsequent to FIG. 10.

After completion of formation of the MR film 20, as shown in FIG. 11, the under layer 122A and the magnetic domain control layer 122B are stacked by sputtering or the like in the region etched in the process of completing formation of the MR film 20, thereby forming the first magnetic domain control parts 122. Further, the insulating film 13 is formed by sputtering on the first magnetic domain control parts 122. It is desirable that the top face of the insulating film 13 (boundary surface 13U) be at the same level as the top face of the MR film 20 (boundary surface 20U) in the stacking direction or at a level lower than the boundary surface 20U. It can suppress passage of the magnetic flux of the signal magnetic field to the upper shield layer 14 at the time of reproducing operation, the bit length is specified by the width corresponding to the thickness of the MR film 20, and smaller PW50 is obtained. It is also desirable to form the insulating film 13 at an angle lower than that in the case of forming the first magnetic domain control part 122. In such a manner, the pair of magnetic domain control films 12 can be covered more reliably.

Figure 12:
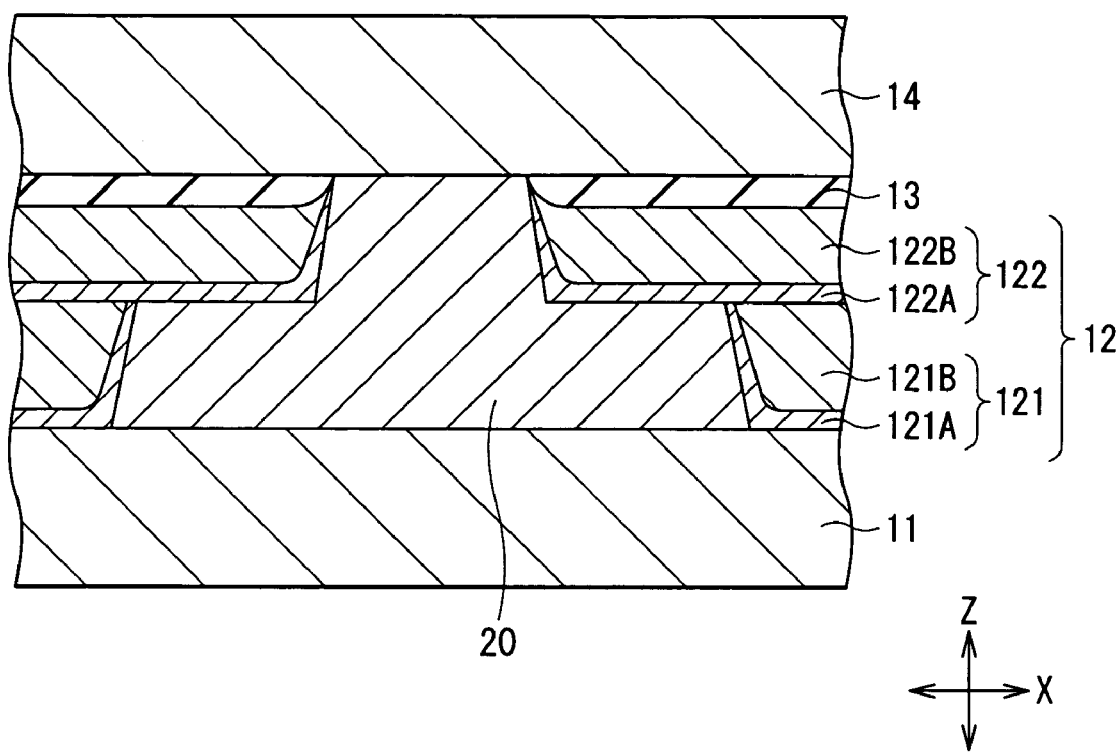
FIG. 12 is a cross section of a main portion showing a process subsequent to FIG. 11.

Finally, the photoresist pattern 41B is removed and, after that, as shown in FIG. 12, the upper shield layer 14 is formed on the entire surface, thereby completing the MR element 10A.

After that, as shown in FIGS. 3 and 4, by forming the insulating layer 16 on the entire surface, the reproduction head part 1A is completed. Subsequently, the bottom magnetic pole 41 and the recording gap layer 42 are formed in order on the reproduction head part 1A, and the coil 44 is selectively formed on the recording gap layer 42. After that, by etching a part of the recording gap layer 42, the opening 42A is formed. Subsequently, the insulating layer 45 is formed so as to cover the coil 44, and the pole chip 43 and the coupling part 46 are sequentially formed. Finally, the top magnetic pole 47 is formed so as to cover the whole, thereby completing the recording head part 1B. After that, for example, by performing a predetermined process such as mechanical process on the slider 2A to form the recording medium facing surface 2F, the thin film magnetic head 1 is completed.

By the method of manufacturing the thin film magnetic head of the embodiment including the processes as described above, the MR film 20 including the upper layer part 20B having the narrower first width W1 and the lower layer part 20A having the second width W2 wider than the first width W1 in the X direction can be formed. Thus, the MR film 20 can be adapted to read information on the magnetic recording medium 3 having narrower recording track width. Further, since the pair of magnetic domain control films 12 constructed by the pair of first magnetic domain control parts 122 corresponding to the first width W1 of the upper layer part 20B and the pair of second magnetic domain control parts 121 corresponding to the second width W2 of the lower layer part 20A can be formed, a sufficient vertical bias magnetic field can be applied to the magnetic sensitive layer 34.

In the method of manufacturing the thin film magnetic head of the embodiment, in the process of forming the insulating film 13 on the pair of magnetic domain control films 12, the insulating film 13 is formed at an angle lower than that in the case of forming the first magnetic domain control part 122 by sputtering. Consequently, the pair of magnetic domain control films 12 and the upper shield layer 14 can be insulated from each other more reliably. Thus, narrower effective track width is specified reliably, and the thin film magnetic head can be adapted to higher recording density.

First Modification

First modification (modification 1) of the MR element 10A in the thin film magnetic head 1 of the embodiment will now be described with reference to FIG. 13.

Figure 13:
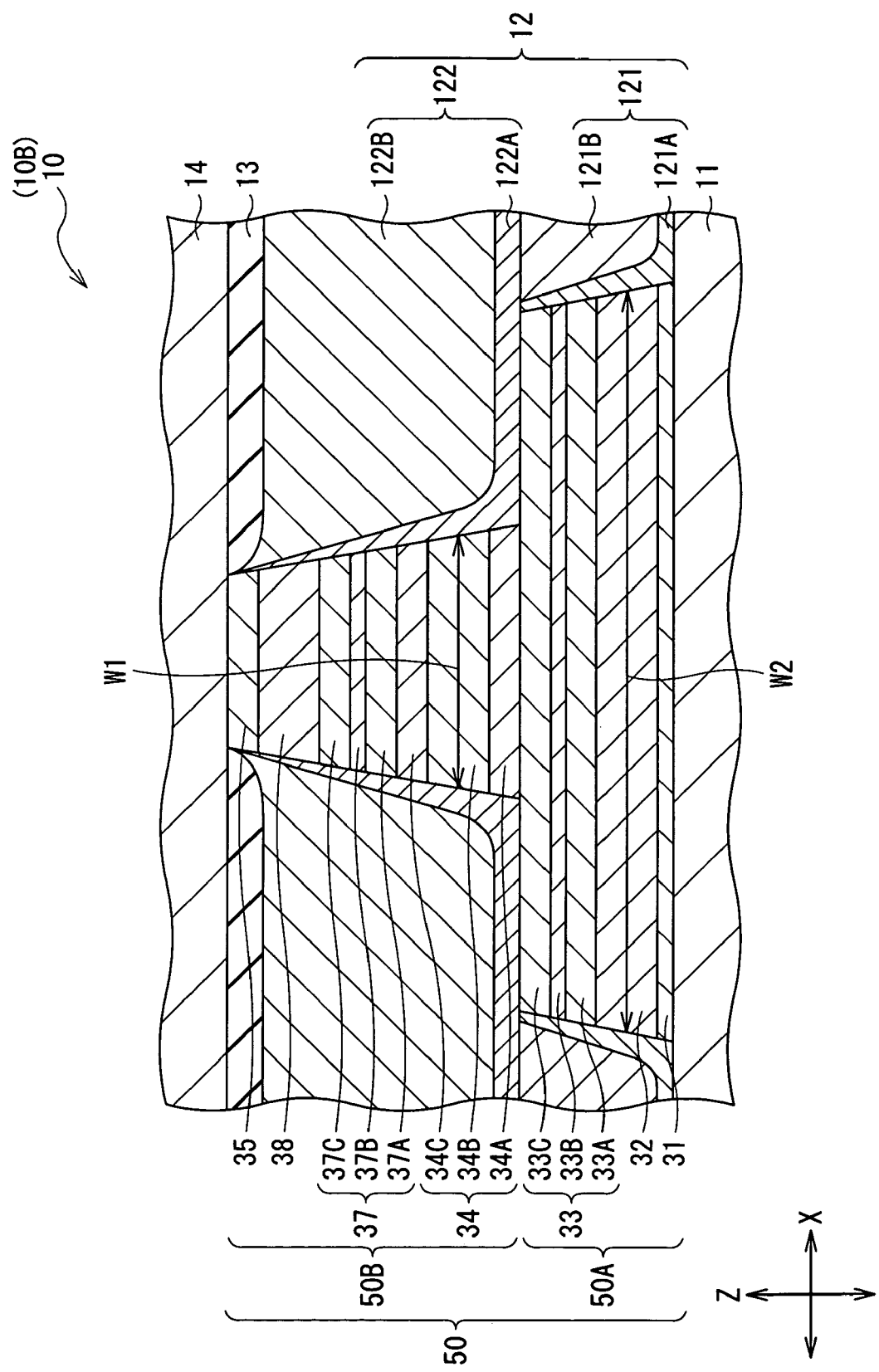
FIG. 13 is a cross section of a main portion showing a structure as a first modification (modification 1) of the thin film magnetic head illustrated in FIG. 3.

FIG. 13 shows a sectional configuration of an MR element 10B as a first modification of the MR element 10A in the embodiment, and corresponds to FIG. 5 of the embodiment. The MR element 10A of the embodiment has the generally-called single SV structure in which one antiferromagnetic layer and one magnetization direction pinned layer correspond to one magnetic sensitive layer. In contrast, the MR element 10B of the modification has a generally-called dual SV structure in which, as shown in FIG. 13, another antiferromagnetic layer and another magnetization direction pinned layer are provided in the upper layer portion, and two antiferromagnetic layers and two magnetization direction pinned layers correspond to one magnetic sensitive layer.

Concretely, as shown in FIG. 13, an MR element 50 in the MR element 10B of the modification includes, in order from the side of the lower shield layer 11, a lower layer part 50A having the antiferromagnetic layer 32 and extending so that the width in the X direction is equal to the second width W2, and an upper layer part 50B having the magnetic sensitive layer 34 and extending so that the width in the X direction is equal to the first width W1.

The lower layer part 50A has a structure in which the under layer 31, antiferromagnetic layer 32, and magnetization direction pinned layer 33 are formed in this order on the lower shield layer 11. On the other hand, the upper layer part 50B has, in order from the side of the lower layer part 50A, the magnetic sensitive layer 34, a magnetization direction pinned layer 37 as a second magnetization direction pinned layer, an antiferromagnetic layer 38 as a second antiferromagnetic layer, and the protection layer 35. Like the antiferromagnetic layer 32, the antiferromagnetic layer 38 is made of an antiferromagnetic material such as PtMn or IrMn and functions so as to pin the magnetization direction of the magnetization direction pinned layer 37. Further, the magnetization direction pinned layer 37 has a synthetic structure in a manner similar to the magnetization direction pinned layer 33 and has, for example, a three-layer structure in which a nonmagnetic layer 37B made of copper, gold, or the like is formed between two ferromagnetic layers 37A and 37C made of CoFe or the like. In the magnetization direction pinned layer 37, the magnetization directions of the ferromagnetic layers 33A and 33C are pinned by the antiferromagnetic layer 38.

The thin film magnetic head 1 provided with the MR element 10B having such a dual SV structure reads recorded information as follows. In the MR film 50, a change occurs in electric resistance when relative directions of magnetization change between the two magnetization direction pinned layers 33 and 37, which are not influenced by a signal magnetic field. By detecting a change in sense current accompanying the change, recorded information is read.

In the thin film magnetic head having the MR element 10B of the modification, the resistance change amount ΔR larger than that in the case where the MR element 10A having the single SV structure is provided is obtained. Since the antiferromagnetic layer 38 having the first width W1 and relatively high resistivity is included in the upper layer part 50B, the resistance value R of the whole MR element is larger than that in the case of the MR element 10A of the single SV structure. However, in the dual SV structure, information recorded at higher density on the magnetic recording medium 3 can be read at higher sensitivity and formation of a magnetic domain of the magnetic sensitive layer 34 can be promoted more in the case where the MR element 10B of the modification is provided as compared with the case where the magnetic sensitive layer and the two antiferromagnetic layers have the same width. Thus, reading operation can be performed more stably.

Second Modification

A second modification (modification 2) of the MR element 10A in the thin film magnetic head 1 of the embodiment will now be described with reference to FIG. 14.

Figure 14:
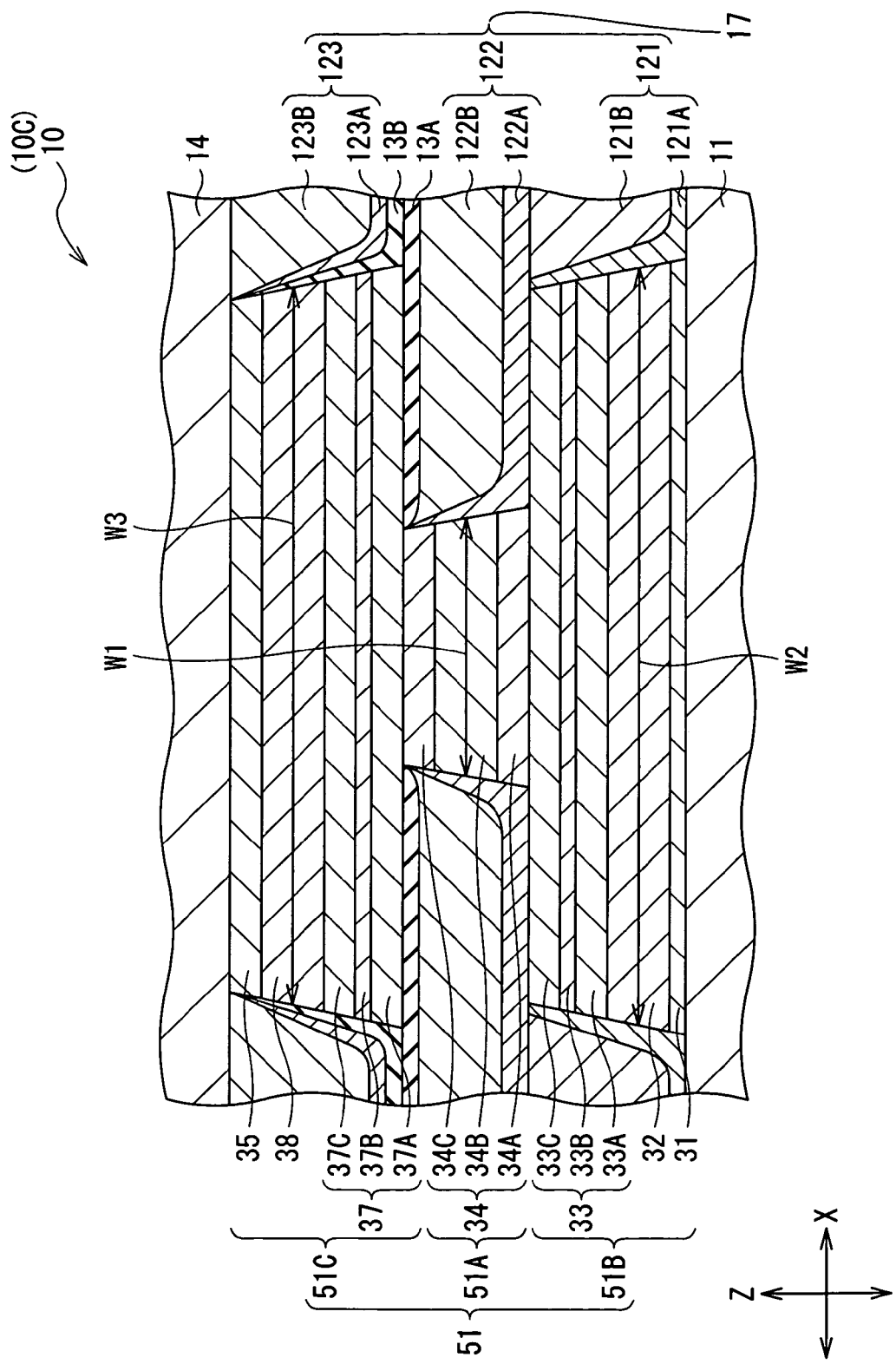
FIG. 14 is a cross section of a main portion showing a structure as a second modification (modification 2) of the thin film magnetic head illustrated in FIG. 3.

FIG. 14 shows a sectional configuration of an MR element 10C as a second modification of the MR element 10A in the embodiment, and corresponds to FIG. 5 of the embodiment. The MR element 10C of the modification has a generally; called single SV structure in a manner similar to the MR element 10B of the first modification. In the first modification, the width of the magnetization direction pinned layer 37 and the antiferromagnetic layer 38 in the upper layer part 50B correspond to the first width W1 of the magnetic sensitive layer 34. In the second modification, a third stacked part 51C including the magnetization direction pinned layer 37 and the antiferromagnetic layer 38 has third width W3 larger than the first width W1.

To be specific, an MR film 51 in the MR element 10C of the modification is constructed by: a first stacked part 51A having the magnetic sensitive layer 34 and extending so as to have the first width W1 as the width in the X direction; a second stacked part 51B having the antiferromagnetic layer 32 and extending so as to have the second width W2 larger than the first width W1 as the width in the X direction; and the third stacked part 51C provided on the side opposite to the second stacked part 51B while sandwiching the first stacked part 51A and extending so as to have third width W3 larger than the first width W1 as the width in the X direction. The second and third widths W2 and W3 may be the same or different from each other. Further, the MR element 10C includes a pair of magnetic domain control films 17 facing each other while sandwiching the MR film 51 in the X direction. The pair of magnetic domain control films 17 are constructed by: the pair of magnetic domain control parts 122 disposed so as to face each other at an interval corresponding to the first width W1 while sandwiching the first stacked part 51A in the X direction and applying a vertical bias magnetic field to the magnetic sensitive layer 34; the pair of second magnetic domain control parts 121 disposed so as to face each other while sandwiching the second stacked part 51B in the X direction and applying a vertical bias magnetic field to the magnetic sensitive layer 34; and a pair of third magnetic domain control parts 123 disposed so as to face each other while sandwiching the third stacked part 51C in the X direction and applying a vertical bias magnetic field to the magnetic sensitive layer 34. The third magnetic domain control part 123 has an under layer 123A and a magnetic domain control film 123B in order from the side of the first magnetic domain control part 122.

The more detailed configuration of the MR element 10C will be described with reference to FIG. 14. As shown in FIG. 14, the first stacked part 51A has the magnetic sensitive layer 34 in which the nonmagnetic layer 34A, ferromagnetic layer 34B, and nonmagnetic layer 34C are stacked in order from the side of the second stacked part 51B. The second stacked part 51B has a structure in which the under layer 31, antiferromagnetic layer 32, and magnetization direction pinned layer 33 are formed in this order on the lower shield layer 11. Further, the third stacked part 51C has the magnetization direction pinned layer 37 as a second magnetization direction pinned layer, the antiferromagnetic layer 38 as a second antiferromagnetic layer, and the protection layer 35 in order from the side of the first stacked part 51A. Preferably, as shown in FIG. 14, the third stacked part 51C is electrically insulated from the first magnetic domain control part 122 by the insulating film 13A and is electrically insulated from the third magnetic domain control part 123 by the insulating film 13B so that the current path in the reproducing operation is limited to the width of the first stacked part 51A with reliability without being expanded in the X direction. In this case, the first magnetic domain control part 122 and the third magnetic domain control part 123 may not be electrically insulated from each other. Most preferably, the first to third stacked parts 51A to 51C are formed so that their end surfaces are perpendicular to the X direction. It is assumed here that the first width W1 is an average width of the ferromagnetic layer 34B in the magnetic sensitive layer 34, the second width W2 is an average width of the antiferromagnetic layer 32 and, further, the third width W3 is an average width of the antiferromagnetic layer 38.

In the thin film magnetic head having the MR element 10C of the modification, the resistance change amount ΔR larger than that in the case where the MR element 10A having the single SV structure is provided is obtained. Since the third stacked part 51C including the antiferromagnetic layer 38 having high resistivity has the third width W3 larger than the first width W1, the resistance value R of the whole MR element can be reduced as compared with the case of the MR element 10B of the first example. Therefore, the MR rate ΔR/R can be further increased, so that a weak signal magnetic field from the magnetic recording medium 3 of which density is increased can be detected at higher sensitivity as compared with the MR elements 10A and 10B.

Third Modification

A third modification (modification 3) of the MR element 10A in the thin film magnetic head 1 of the embodiment will now be described with reference to FIG. 5.

The embodiment is not limited to the case where the first and second magnetic domain control parts 122 and 121 have the same coercive force but the first and second magnetic domain control parts 122 and 121 can be constructed to have coercive forces which are different from each other. For example, the second magnetic domain control part 121 may have a coercive force higher than that of the first magnetic domain control part 122. On the contrary, the second magnetic domain control part 121 may have a coercive force lower than that of the first magnetic domain control part 122.

Concretely, for example, either the magnetic domain control layer 122B in the first magnetic domain control part 122 or the magnetic domain control layer 121B in the second magnetic domain control part 121 is made of a cobalt platinum alloy (CoPt), and the other layer is made of a cobalt chromium platinum alloy (CoCrPt), thereby making coercive forces of the layers different from each other. In this case, the magnetic domain control layer made of CoPt becomes a high magnetic force layer having a relatively high coercive force, and the magnetic domain control layer made of CoCrPt becomes a low magnetic force layer having a relatively low coercive force. Preferably, CoPt has a composition displaying a coercive force of about $2.0/(4\pi) \times 10^6$ A/m (=2.0 kOe), and CoCrPt has a composition displaying a coercive force of about $1.2/(4\pi) \times 10^6$ A/m (=1.2 kOe). CoPt has a composition in which content of Co is about 50%, which displays relatively low saturation magnetization.

Alternately, the coercive force of the first magnetic domain control part 122 and that of the second magnetic domain control part 121 may be made different from each other by changing the compositions of the under layers 122A and 121A while making the materials of the magnetic domain control layers 122B and 121B unchanged.

In the case of constructing the first magnetic domain control part 122 corresponding to the upper layer part 20B and the second magnetic domain control part 121 corresponding to the lower layer part 20A so as to have different coercive forces, flexibility in designing such as dimensions and shapes increases. Consequently, while assuring the effective track width corresponding to a narrow recording track width of a magnetic recording medium, a desired magnetic field distribution can be easily formed. By using the coercive force difference, the first magnetic domain control part 122 and the second magnetic domain control part 121 may have magnetization directions which are different from each other.

Concretely, the magnetic domain control film 12 in which the magnetization direction of the first magnetic domain control part 122 and that of the second magnetic domain control part 121 are different from each other is formed as follows. In the manufacturing processes described in the foregoing embodiment, for example, the magnetic domain control layer 121B is formed by using CoPt in the process of forming the second magnetic domain control part 121, and the magnetic domain control layer 122B is formed by using CoCrPt in the process of forming the first magnetic domain control part 122. After that, first, by applying an external magnetic field larger than the coercive force in the second magnetic domain control part 121, the second magnetic domain control part 121 is polarized in a direction (for example, Y direction) orthogonal to the direction of the axis of easy magnetization of the magnetic sensitive layer 34. Subsequently, by applying an external magnetic field which is smaller than the coercive force in the second magnetic domain control part 121 and larger than the coercive force in the first magnetic domain control part 122, the first magnetic domain control part 122 is polarized in the magnetization direction corresponding to the direction of the axis of easy magnetization of the magnetic sensitive layer 34 (for example, the X direction) without changing the magnetization direction of the second magnetic domain control part 121. With such a configuration, the magnetic domain control film 12 constructed by the first magnetic domain control part 122 having a relatively low coercive force and having the magnetization direction corresponding to the direction of the axis of easy magnetization of the magnetic sensitive layer 34 and the second magnetic domain control part 121 having a relatively high coercive force and the magnetization direction orthogonal to the direction of the axis of easy magnetization of the magnetic sensitive layer 34 can be formed.

By constructing the magnetic domain control film 12 as described above, the magnetic sensitive layer 34 is sufficiently formed as a single magnetic domain by the action of the first magnetic domain control part 122, and magnetization in the magnetization direction pinned layer 35 is pinned more securely by the action of the second magnetic domain control part 121. As a result, at the time of reproducing operation of magnetic information, a stabler output can be obtained efficiently.

The provision of the coercive force difference for the magnetic domain control film can be applied not only to the MR element 10A shown in FIG. 5 but also to the MR element 10B in FIG. 13 and the MR element 10C in FIG. 14. That is, also in the MR element 10B, the first magnetic domain control part 122 and the second magnetic domain control part 121 may have coercive forces which are different from each other. Also in the MR element 10C, the first to third magnetic domain control parts 121 to 123 may have coercive forces which are different from each other. In the case of the MR element 10C, by polarization using the coercive force difference, the magnetization direction of the first magnetic domain control part 122 can be made correspond to the direction of the axis of easy magnetization of the magnetic sensitive layer 34, and the magnetization directions of the second and third magnetic domain control parts 121 and 123 can be made correspond to the magnetization directions of the magnetization direction pinned layers 33 and 37, which are different from the direction of the axis of easy magnetization of the magnetic sensitive layer 34. In such a case as well, the magnetic sensitive layer 34 is excellently formed as a single magnetic domain, and an output can be improved.

Second Embodiment

An MR element 10D in the thin film magnetic head 1 of a second embodiment of the invention will now be described with reference to FIG. 15.

Figure 15:
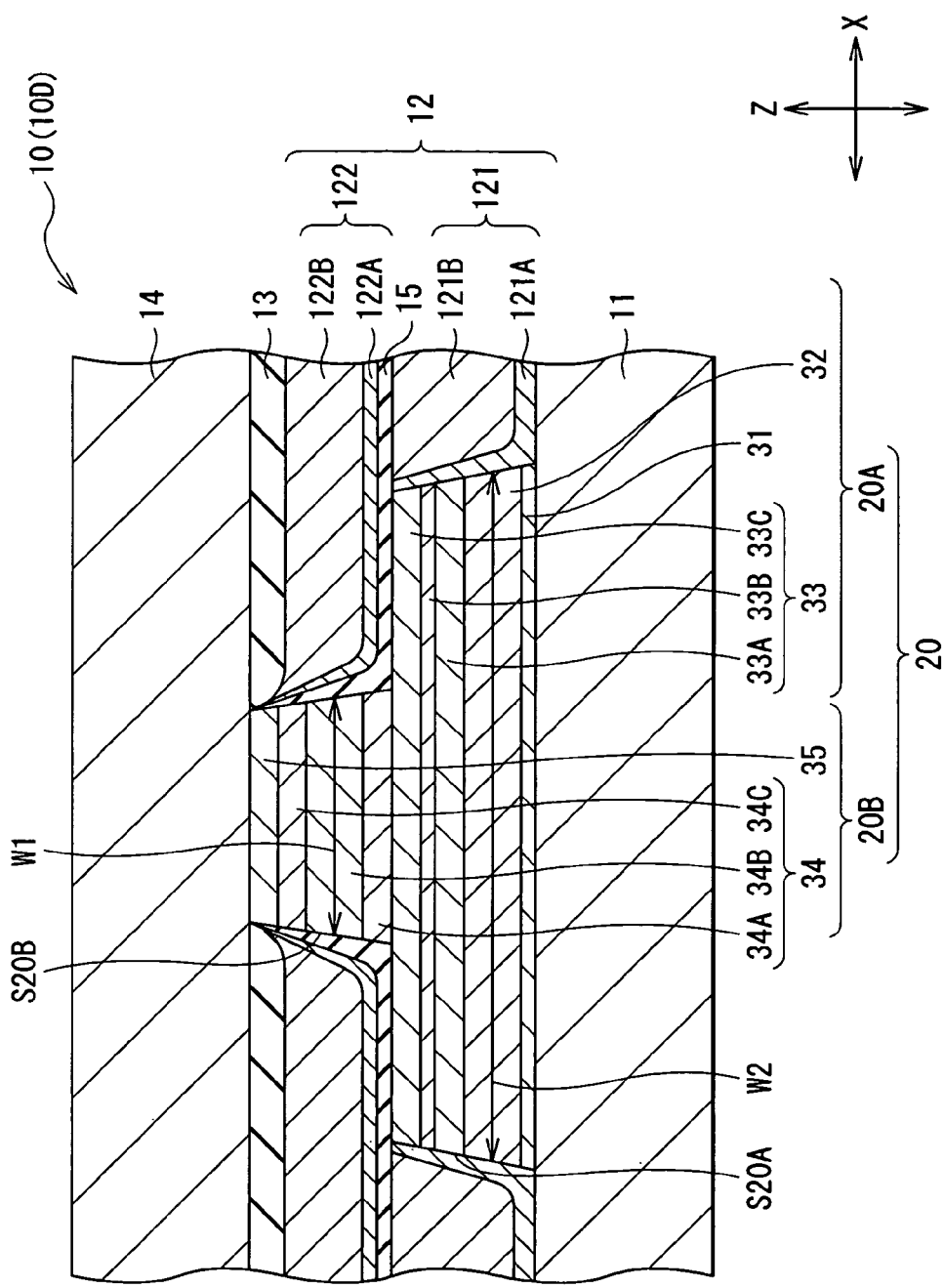
FIG. 15 is a cross section showing a configuration of a thin film magnetic head according to a second embodiment of the invention.

FIG. 15 shows a sectional configuration of the MR element 10D in the thin film magnetic head 1 of the second embodiment and corresponds to FIG. 5 of the first embodiment. In FIG. 15, the same reference numerals are designated to components which are substantially the same as the components shown in FIG. 5.

In the following, the configuration of the thin film magnetic head of the second embodiment will be described mainly with respect to the points different from the first embodiment and repetitive description will not be given.

The MR element 10A of the first embodiment is constructed so that the pair of first magnetic domain control parts 122 are in contact with the upper layer part 20B. In contrast, the MR element 10D of the second embodiment is constructed so that, as shown in FIG. 15, a pair of intermediate insulating films 15 is provided between the pair of first magnetic domain control parts 122 and the upper layer part 20B. The pair of intermediate insulating films 15 are made of an electrically and magnetically insulative material such as $Al_2O_3$ or $AlN$.

As described above, by providing the pair of intermediate insulating films 15, leakage of the sense current flowing between the lower shield layer 11 and the upper shield layer 14 to the first magnetic domain control part 122 is suppressed. Specifically, the sense current is reliably limited to the width of the upper layer part 20B and passes without expanding in the X direction, so that a resistance change in the sense current caused by a change in the magnetization direction of the magnetic sensitive layer 34 can be detected at higher sensitivity.

In this case, it is desirable that the pair of intermediate insulating films 15 have a thickness of 5 nm to 10 nm. When the thickness is less than 5 nm, it is difficult to assure sufficient electric insulation. On the other hand, when the thickness exceeds 10 nm, it is feared that magnetic insulation occurs and application of the vertical bias magnetic field by the first and second magnetic domain control parts 122 and 121 to the magnetic sensitive layer 34 is disturbed.

In FIG. 15, the pair of intermediate insulating films 15 cover the pair of end surfaces S20B of the upper layer part 20B and extend in the X direction so as to cover the top surfaces of the lower layer part 21A and the second magnetic domain control part 121. However, it is sufficient to cover at least the pair of end surfaces S20B to obtain the above-described effects.

The MR element 10D of the embodiment may be also constructed so that the first and second magnetic domain control parts 122 and 121 have coercive forces which are different from each other. In this case, the first magnetic domain control part 122 has a magnetization direction corresponding to the direction of the axis of easy magnetization of the magnetic sensitive layer 34, and the second magnetic domain control part 121 has a magnetization direction which is orthogonal to the magnetization direction of the first magnetic domain control part 122.

EXAMPLES

Concrete examples in the first and second embodiments will now be described.

In the following examples 1 to 4, samples of the thin film magnetic head 1 including the MR element 10A having the sectional structure shown in FIG. 5 were formed on the basis of the manufacturing method described in the first embodiment. Only examples 1 and 2 (which will be described later) correspond to the MR element 10D shown in FIG. 15. Characteristic research was made with respect to the samples and will be described hereinbelow with reference to FIGS. 16 to 19.

First Example (Example 1)

Figure 16:
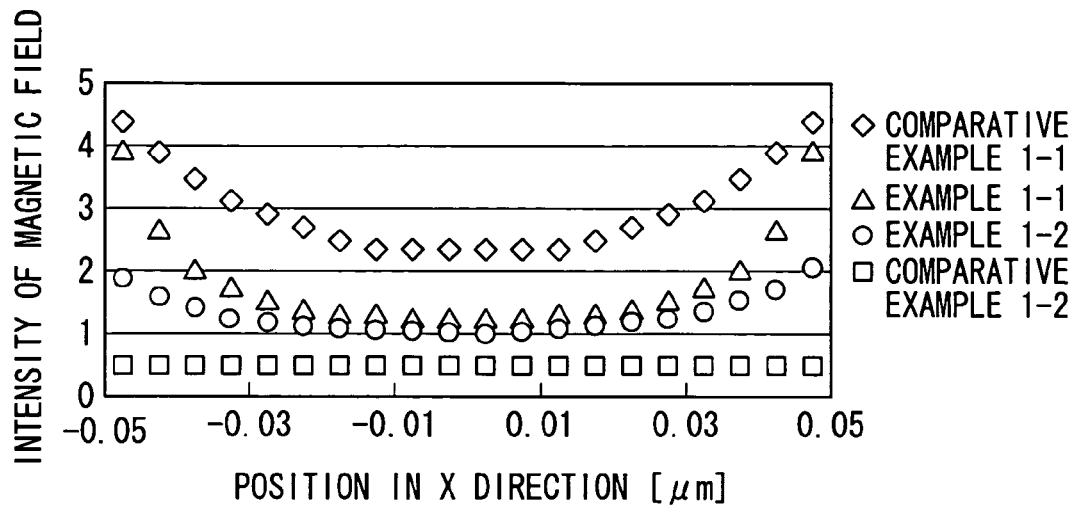
FIG. 16 is a characteristic diagram showing a vertical bias magnetic field distribution in a first example (example 1) of the invention.

FIG. 16 shows an intensity distribution of a vertical bias magnetic field applied to the MR element 20 sandwiched by the pair of magnetic domain control films 12 in the case where the first width W1 is 0.1 μm and the thickness of the whole pair of magnetic domain control films 12 is 50 nm. The vertical axis shows intensity of the magnetic field (in arbitrary unit), and the horizontal axis indicates a position (μm) in the X direction. In the horizontal axis, a center position in the X direction of the MR film 20 in the MR elements 10A and 10D is set as 0 (zero). "Δ" in the diagram shows the characteristic of the first example (example 1-1) in which the MR element 10A is provided. In Example 1-1, the pair of first magnetic domain control parts 122 with a thickness of 15 nm were disposed so as to face each other at an interval of 0.1 μm, and the pair of second magnetic domain control parts 121 with a thickness of 35 nm were disposed so as to face each other at an interval of 0.3 μm. Further, "○" indicates the characteristic of the first example (Example 1-2) in which the MR element 10D including the pair of intermediate insulating films 15 having a thickness of 10 nm is provided. In Example 1-2, the pair of first magnetic domain control parts 122 having a thickness of 15 nm were disposed so as to face each other at an interval of 0.12 μm, and the pair of second magnetic domain control parts 121 having a thickness of 35 nm were disposed so as to face each other at an interval of 0.3 μm. In Comparative Example 1-1 shown by "◇", the pair of magnetic domain control films having a thickness of 50 nm were disposed so as to face each other at an interval of 0.1 μm. In Comparative Example 1-2 indicated by "□", the pair of magnetic domain control films having a thickness of 50 nm were disposed so as to face each other at an interval of 0.3 μm.

As shown in FIG. 16, in Comparative Example 1-1, although the intensity of the magnetic field is high as a whole, a magnetic field distribution is inclined sharply in the X direction, and it is difficult to apply a uniform vertical bias magnetic field to the magnetic sensitive layer. In Comparative Example 1-2, a vertical bias magnetic field can be applied to the whole more uniformly, but the intensity of the general magnetic field is insufficient. In contrast, in Examples 1-1 and 1-2, a magnetic field larger than that in Comparative Examples 1-2 can be obtained, and a flat portion in the magnetic field distribution can be assured more widely than that in Comparative Example 1-1. When Examples 1-1 and 1-2 are compared with each other, a relatively strong magnetic field can be obtained as a whole in Example 1-1, and a magnetic field displaying a larger flat distribution for the whole can be obtained in Example 1-2. It is understood from the above result that, with the configurations of Examples 1-1 and 1-2, a relatively strong and relatively uniform vertical bias magnetic field can be applied to the magnetic sensitive layer, and formation of a single magnetic domain can be promoted.

Second Example (Example 2)

Figure 17:
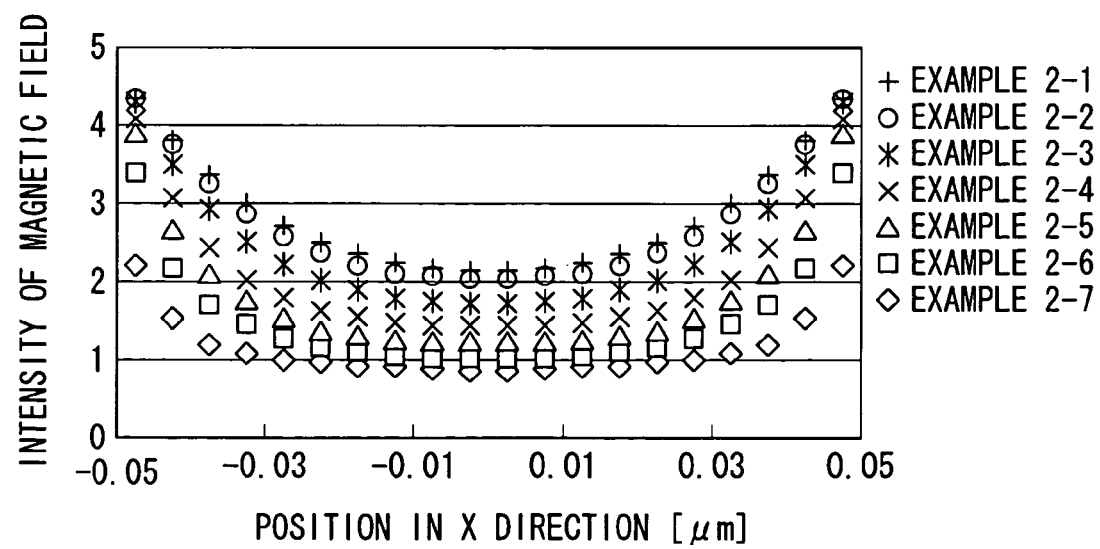
FIG. 17 is a characteristic diagram showing a vertical bias magnetic field distribution in a second example (example 2) of the invention.

FIG. 17 shows an intensity distribution of a vertical bias magnetic field in the case where the thickness of the whole pair of magnetic domain control film 12 is 50 nm. In each of examples (Examples 2-1 to 2-7), the pair of first magnetic domain control parts 122 were disposed so as to face each other at an interval of 0.1 μm, and the pair of second magnetic domain control parts 121 were disposed so as to face each other at an interval of 0.3 μm. The thickness T1 of the first magnetic domain control part 122 was set to 45, 40, 30, 20, 15, 10, and 5 nm in order from Example 2-1. The thickness T2 of the second magnetic domain control part 121 was set to 5, 10, 20, 30, 35, 40, and 45 nm in order from Example 2-1 so as to correspond to the thickness T1.

As shown in FIG. 17, in order from Example 2-1 to Example 2-7, that is, as the thickness T1 decreases and the thickness T2 increases, the intensity of the magnetic field decreases as a whole but the flat portion in the magnetic field distribution becomes wider. On the contrary, in order from Example 2-7 to Example 2-1, that is, as the thickness T1 increases and the thickness T2 decreases, the flat portion in the magnetic field distribution is narrowed, and the intensity of the magnetic field to be applied to the magnetic sensitive layer 34 increases as a whole. As a result, it is understood that the balance between the intensity of the magnetic field and uniformity of the magnetic field distribution is maintained excellently particularly in the case of the configurations of Examples 2-4, 2-5, and 2-6 (T1/T2=20/30, 15/35, and 10/40) satisfying the range of the conditional expression (1) in the invention.

Third Example (Example 3)

Figure 18:
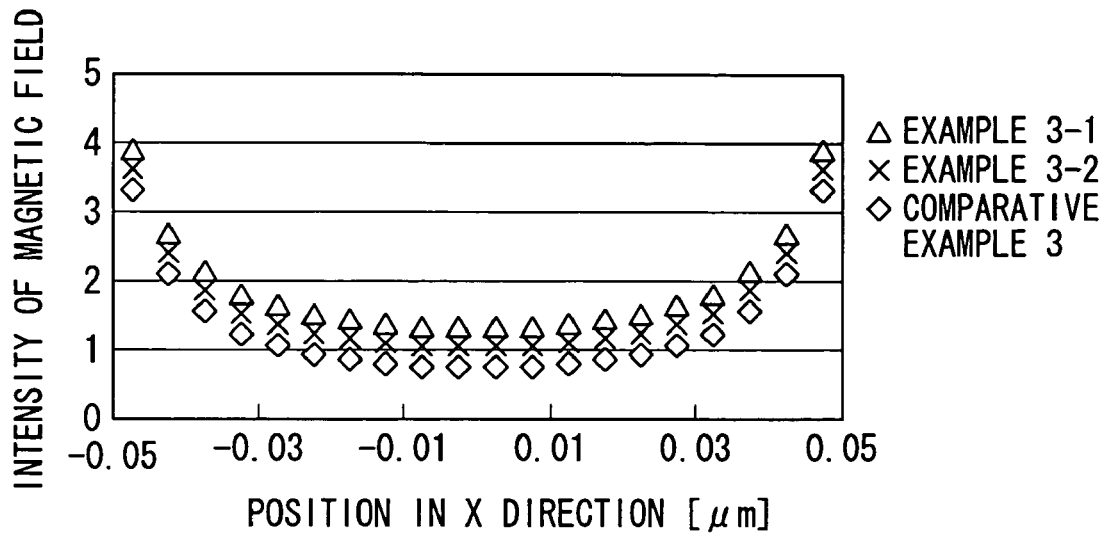
FIG. 18 is a characteristic diagram showing a vertical bias magnetic field distribution in a third example (example 3) of the invention.

FIG. 18 shows an intensity distribution of the vertical bias magnetic field in a manner similar to FIGS. 16 and 17. Particularly, FIG. 18 shows an influence on the intensity of the magnetic field of the pair of second magnetic domain control parts 121. In Example 3-1 indicated by "Δ", the pair of first magnetic domain control parts 122 having a thickness of 15 nm were disposed so as to face each other at an interval of 0.1 μm, and the pair of second magnetic domain control parts 121 having a thickness of 35 nm were disposed so as to face each other at an interval of 0.3 μm. Further, in Example 3-2 indicated by "×", the pair of first magnetic domain control parts 122 having a thickness of 15 nm were disposed so as to face each other at an interval of 0.1 μm, and the pair of second magnetic domain control parts 121 having a thickness of 35 nm were disposed so as to face each other at an interval of 0.5 μm. Comparative Example 3 in which the pair of magnetic domain control films having a thickness of 15 nm were disposed so as to face each other at an interval of 0.1 μm is shown by "◇".

As shown in FIG. 18, in Examples 3-1 and 3-2, the intensity of the magnetic field is higher than that in Comparative Example 3 as a whole. This is an effect of the pair of second magnetic domain control parts 121. As a result, it was recognized that, by setting the second width W2 in the range from 0.3 μm to 0.5 μm, the intensity of the magnetic field can be effectively increased without loosing uniformity of the intensity distribution in the X direction.

Fourth Example (Example 4)

Figure 19:
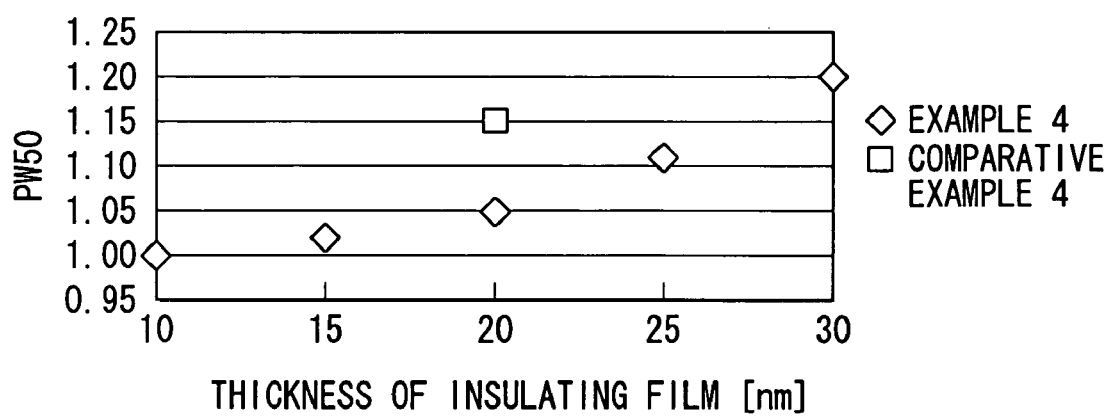
FIG. 19 is a characteristic diagram showing the characteristics of a PW 50 in a fourth example (example 4) of the invention.

FIG. 19 shows a result of measurement of PW50 with respect to the thin film magnetic head 1 having the MR element 10B (Example 4). The horizontal axis indicates the thickness (nm) of the insulating film 13, and the vertical axis indicates PW50. The values are standardized by setting the value of PW50 in the case where the thickness of the insulating film 13 is 10 nm to 1. As Comparative Example 4, with respect to the MR element 110 shown in FIG. 20, the PW50 is indicated by "□" in the case where the thickness of the insulating film 113 is 20 nm.

As shown in FIG. 19, in Example 4, there is a tendency that when the thickness of the insulating film 13 increases, the PW50 also increases. In the case of comparison under the conditions of the same thickness, the PW50 in Example 4 is smaller than that in Comparative Example 4. That is, it was recognized that when the under face of the upper shield layer 14 (boundary surfaces 13U and 50U) is not rough but is flat, in a reproducing operation, a magnetic flux of signal magnetic fields of the magnetic recording medium 3 is formed concentratedly in the MR film 50 without being leaked to the upper shield layer 14. Although not shown, the tendency similar to that of the PW50 could be recognized also in MRWu.

Fifth Example (Example 5)

With respect to the MR element 10B of the first modification shown in FIG. 13, the resistance value of each of the layers was calculated. The result of the calculation is shown in Table 1 together with a material and thickness of each of the layers (Example 5). In Example 5, the first width W1 was set to 0.1 μm, and the second width W2 was set to 0.3 μm. Each of the magnetization direction pinned layers 33 and 37 was constructed to have a single layer structure made of CoFe. Table 1 also shows Comparative Example 5 in which the resistance value of each of layers in the case where each of the first and second widths W1 and W2 is 0.1 μm was calculated. Each of the resistance values shown in Table 1 was standardized by using the resistance value R of the whole MR film in Comparative Example 5 as 1.

TABLE 1

| Components of MR film 50 | Material | Thickness (nm) | Resistance Value [−] Comparative Example 5 | Example 5 |
|---|---|---|---|---|
| Protective layer 35 | Cu | 5 | 0.011 | 0.011 |
| Antiferromagnetic layer 38 | PtMn | 13 | 0.406 | 0.406 |
| Magnetization direction pinned layer 37 | CoFe | 6 | 0.036 | 0.036 |
| Magnetic sensitive layer 34 | | | | |
| Nonmagnetic layer 34C | Cu | 0.006 | 0.006 | 0.006 |
| Ferromagnetic layer 34B | CoFe | 0.018 | 0.018 | 0.018 |
| Nonmagnetic layer 34A | Cu | 0.006 | 0.006 | 0.006 |
| Mangetization direction Pinned layer 33 | CoFe | 6 | 0.036 | 0.012 |
| Antiferromagnetic layer 32 | PtMn | 13 | 0.406 | 0.135 |
| Under layer 31 | Ta | 5 | 0.075 | 0.025 |
| Resistance Value R of whole MR film 50 | | | 1.000 | 0.655 |

As shown in Table 1, in Example 5, each of the under layer 31, antiferromagnetic layer 32, and magnetization direction pinned layer 33 has the second width W2 which is three times as wide as the first width W1. Therefore, the resistance value in each of the under layer 31, antiferromagnetic layer 32, and magnetization direction pinned layer 33 is decreased to ⅓ of the resistance value of Comparative Example 5. It was understood that the resistance value R of the whole MR film is 0.655 in Example 5 whereas it is 1 in Comparative Example 5. It was also understood that an effect produced by decrease in the resistance value of the antiferromagnetic layer 32 having high specific resistance is particularly large.

Although the invention has been described by the embodiments and the modifications, the invention is not limited to the embodiments and the modifications but can be variously modified. For example, although the embodiments and examples have been described by using the bottom spin valve type as an example of the single spin valve magnetoresistive effect element, the invention is not limited to the bottom spin valve type. The element may be of a top spin valve type. The embodiments and examples have been described with respect to the case where the magnetoresistive effect element is a CPP-GMR element. However, the invention is not limited to the case. For example, the magnetoresistive effective element may be the CIP-GMR element. In this case as well, by constructing a pair of magnetic domain control films by two magnetic domain control parts, a vertical bias magnetic field having good balance between intensity and uniformity can be generated, so that stability of reading operation can be assured.

In the embodiments and examples, the magnetization direction pinned layer has the synthetic structure of three layers. Alternately, a magnetization direction pinned layer of a single layer may be used. Further, although the first width is 0.1 μm in the embodiments and modifications, the width is not limited to 0.1 μm but can be determined in correspondence with the recording track width of a magnetic recording medium to be applied.

Obviously many modifications and variations of the present invention are possible in the light of the above teachings. It is therefore to be understood that within the scope of the appended claims, the invention may be practiced otherwise than as specifically described.

What is claimed is:

1. A thin film magnetic head comprising:
    a magnetoresistive effect film having:
        a first stacked part including a magnetic sensitive layer of which magnetization direction changes according to a signal magnetic field from a magnetic recording medium and extending so that width in a first direction corresponding to a recording track width direction of said magnetic recording medium is first width, and
        a second stacked part having a first antiferromagnetic layer and extending so that the width in said first direction is second width larger than said first width, wherein said second width is equal to or larger than width which is three times as large as said first width, and is equal to or less than width which is ten times as large as said first width; and
    a pair of magnetic domain control films having:
        a pair of first magnetic domain control parts which are disposed so as to face each other at an interval corresponding to said first width while sandwiching said first stacked part in said first direction and applying a vertical bias magnetic field to said magnetic sensitive layer, and
        a pair of second magnetic domain control parts which are disposed so as to face each other while sandwiching said second stacked part in said first direction and applying a vertical bias magnetic field to said magnetic sensitive layer.

2. A thin film magnetic head according to claim 1, wherein said second stacked part further has a first magnetization direction pinned layer of which magnetization direction is pinned by said first antiferromagnetic layer.

3. A thin film magnetic head according to claim 1, wherein said first width lies in a range from 0.05 μm to 0.1 μm, and said second width is in a range from 0.3 μm to 0.5 μm.

4. A thin film magnetic head according to claim 1, wherein said pair of first magnetic domain control parts are in contact with said first stacked part.

5. A thin film magnetic head according to claim 1, wherein said first stacked part further includes a second antiferromagnetic layer and a second magnetization direction pinned layer of which magnetization direction is pinned by the second antiferromagnetic layer.

6. A thin film magnetic head according to claim 1, wherein in a second direction corresponding to a thickness direction of said magnetoresistive effect film, center in thickness of said magnetic sensitive layer is in a position corresponding to center in thickness of said pair of first magnetic domain control parts.

7. A thin film magnetic head according to claim 1, further comprising first and second shield layers which are disposed so as to face each other while sandwiching said magnetoresistive effect film and said pair of magnetic domain control films in a second direction and serve as a current path for passing current in the second direction to said magnetoresistive effect film, wherein
    said first shield layer is in contact with said second stacked part and said pair of magnetic domain control films, and
    said second shield layer is in contact with said first stacked part and is isolated from said pair of magnetic domain control films by an insulating film.

8. A thin film magnetic head according to claim 7, wherein a first boundary surface between said second shield layer and said first stacked part is flat in said first direction, and a second boundary surface between said second shield layer and said insulating film extends in the first direction in a plane extended from said first boundary surface or on the side closer to said first shield layer than the extended plane.

9. A thin film magnetic head according to claim 7, wherein a pair of intermediate insulating films is formed between said pair of first magnetic domain control parts and said first stacked part.

10. A thin film magnetic head according to claim 9, wherein said intermediate insulating film has a thickness which is in a range from 5 nm to 10 nm.

11. A thin film magnetic head according to claim 1, wherein a ratio between thickness in a stacking direction of said first magnetic domain control part and thickness in a stacking direction of second magnetic domain control part satisfies the following conditional expression (1):

$$1/4 \leq T1/T2 \leq 2/3 \tag{1}$$

where T1: thickness in the stacking direction of the first magnetic domain control part T2: thickness in the stacking direction of the second magnetic domain control part.

12. A thin film magnetic head according to claim 11, wherein total of the thickness in the stacking direction of said first magnetic domain control part and the thickness in the stacking direction of said second magnetic domain control part is 50 nm or less.

13. A thin film magnetic head according to claim 1, wherein said pair of first magnetic domain control parts and said pair of second magnetic domain control parts have coercive forces which are different from each other.

14. A thin film magnetic head according to claim 13, wherein either said pair of first magnetic domain control parts or said pair of second magnetic domain control parts is made of a material containing cobalt platinum alloy (CoPt) and the other pair is made of a material containing cobalt chromium platinum alloy (CoCrPt).

* * * * *